(12) United States Patent
Hoppe et al.

(10) Patent No.: US 8,839,820 B2
(45) Date of Patent: Sep. 23, 2014

(54) CONTROL VALVES FOR CONTROLLING PRESSURE MEDIUM FLOWS

(75) Inventors: Jens Hoppe, Erlangen (DE); Andreas Roehr, Heroldsbach (DE); Michael Busse, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 635 days.

(21) Appl. No.: 13/148,531

(22) PCT Filed: Jan. 28, 2010

(86) PCT No.: PCT/EP2010/050974
§ 371 (c)(1),
(2), (4) Date: Aug. 9, 2011

(87) PCT Pub. No.: WO2010/089239
PCT Pub. Date: Aug. 12, 2010

(65) Prior Publication Data
US 2011/0309281 A1    Dec. 22, 2011

(30) Foreign Application Priority Data
Feb. 9, 2009 (DE) .......................... 10 2009 008 056

(51) Int. Cl.
*F16K 11/07* (2006.01)
*F01L 1/34* (2006.01)
*F15B 13/04* (2006.01)
*F01L 1/344* (2006.01)

(52) U.S. Cl.
CPC ........... *F15B 13/0402* (2013.01); *F01L 1/3442* (2013.01); *F16K 11/0716* (2013.01); *F01L 1/34* (2013.01); *F01L 2001/34426* (2013.01)
USPC ................................... 137/625.68; 123/90.17

(58) Field of Classification Search
CPC ............... F16K 11/0716; F01L 1/3442; F01L 2001/34426; F01L 2001/3443; F01L 2001/34453; F01L 2001/34469; F01L 2001/34473
USPC ........................................... 123/90.15, 90.17
See application file for complete search history.

(56) References Cited

U.S. PATENT DOCUMENTS 3,429,341 A * 2/1969 Sochting .................. 137/625.68
5,878,782 A * 3/1999 Nakajima ................ 137/625.65

(Continued)

FOREIGN PATENT DOCUMENTS

DE    196 16 973 A1    10/1997
DE    197 27 180 A1     1/1999

(Continued)

*Primary Examiner* — John Rivell
(74) *Attorney, Agent, or Firm* — Davidson, Davidson & Kappel, LLC

(57) ABSTRACT

A control valve for controlling pressure medium flows, which has a cylindrical valve housing with a housing cavity The housing cavity is open at one side and has an axial outflow port, a radial first working port, a radial second working port, a radial third working port and two radial pressure ports which each open into the housing cavity. A first pressure port is arranged axially between the first working port and the second working port, and a second pressure port is arranged axially between the second working port and the third working port. Also, the control valve has a cylindrical control piston, which is axially movable within the housing cavity and has a piston cavity open at one side in the direction of the outflow port.

14 Claims, 16 Drawing Sheets

(56) References Cited

U.S. PATENT DOCUMENTS

| | | |
|---|---|---|
| 6,260,526 B1 * | 7/2001 | Kobayashi ................ 123/90.17 |
| 6,779,499 B2 * | 8/2004 | Takenaka et al. .......... 123/90.17 |
| 6,779,500 B2 * | 8/2004 | Kanada et al. ............. 123/90.17 |
| 7,444,254 B2 * | 10/2008 | Tsukada et al. ............ 123/90.17 |
| 7,444,971 B2 * | 11/2008 | Suga et al. ................ 123/90.17 |
| 7,506,621 B2 * | 3/2009 | Takahashi et al. ......... 123/90.15 |
| 8,146,550 B2 * | 4/2012 | Takemura ................. 123/90.17 |
| 2003/0121486 A1 | 7/2003 | Komazawa et al. |
| 2008/0066572 A1 | 3/2008 | Takahashi et al. |

FOREIGN PATENT DOCUMENTS

| | | |
|---|---|---|
| DE | 199 08 934 A1 | 9/2000 |
| DE | 102 39 207 A1 | 3/2004 |
| DE | 20 2005 008 264 U1 | 8/2005 |
| DE | 10 2005 013 141 A1 | 9/2006 |
| EP | 1 596 040 A2 | 11/2005 |
| EP | 1 596 041 A2 | 11/2005 |
| EP | 1930560 A2 | 6/2008 |
| WO | 2006/039966 A1 | 4/2006 |
| WO | 2007/126438 A2 | 11/2007 |
| WO | 2008/006717 A1 | 1/2008 |

* cited by examiner

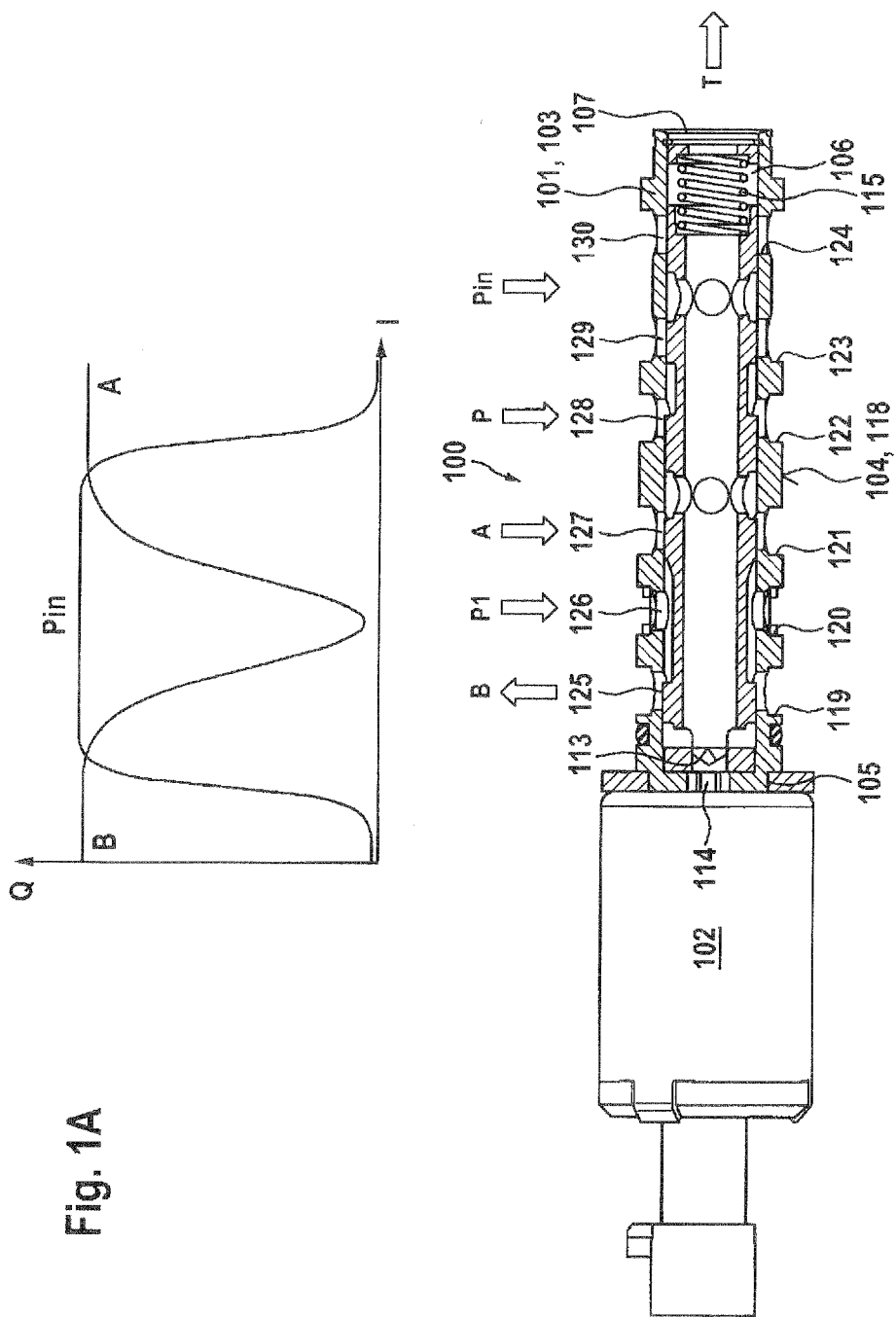

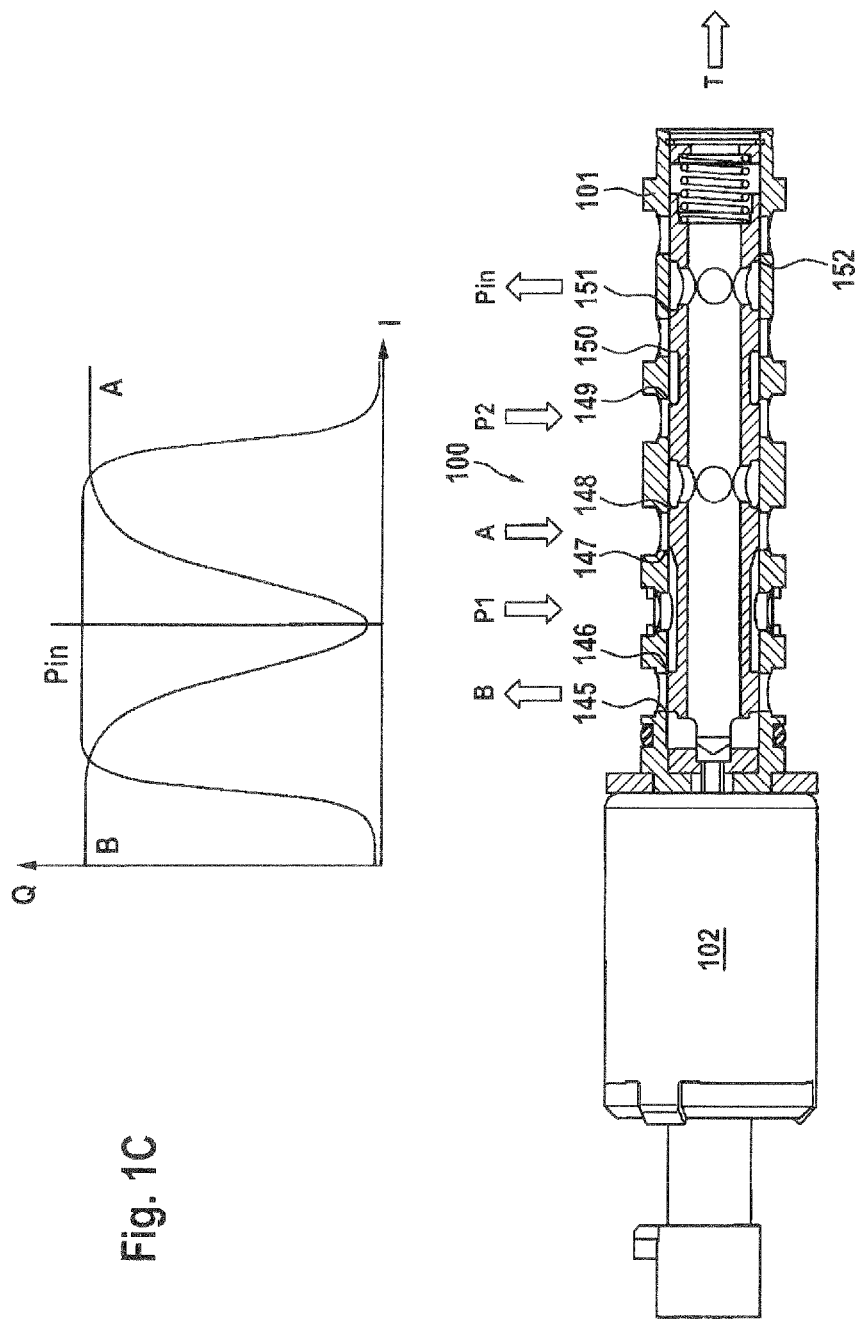

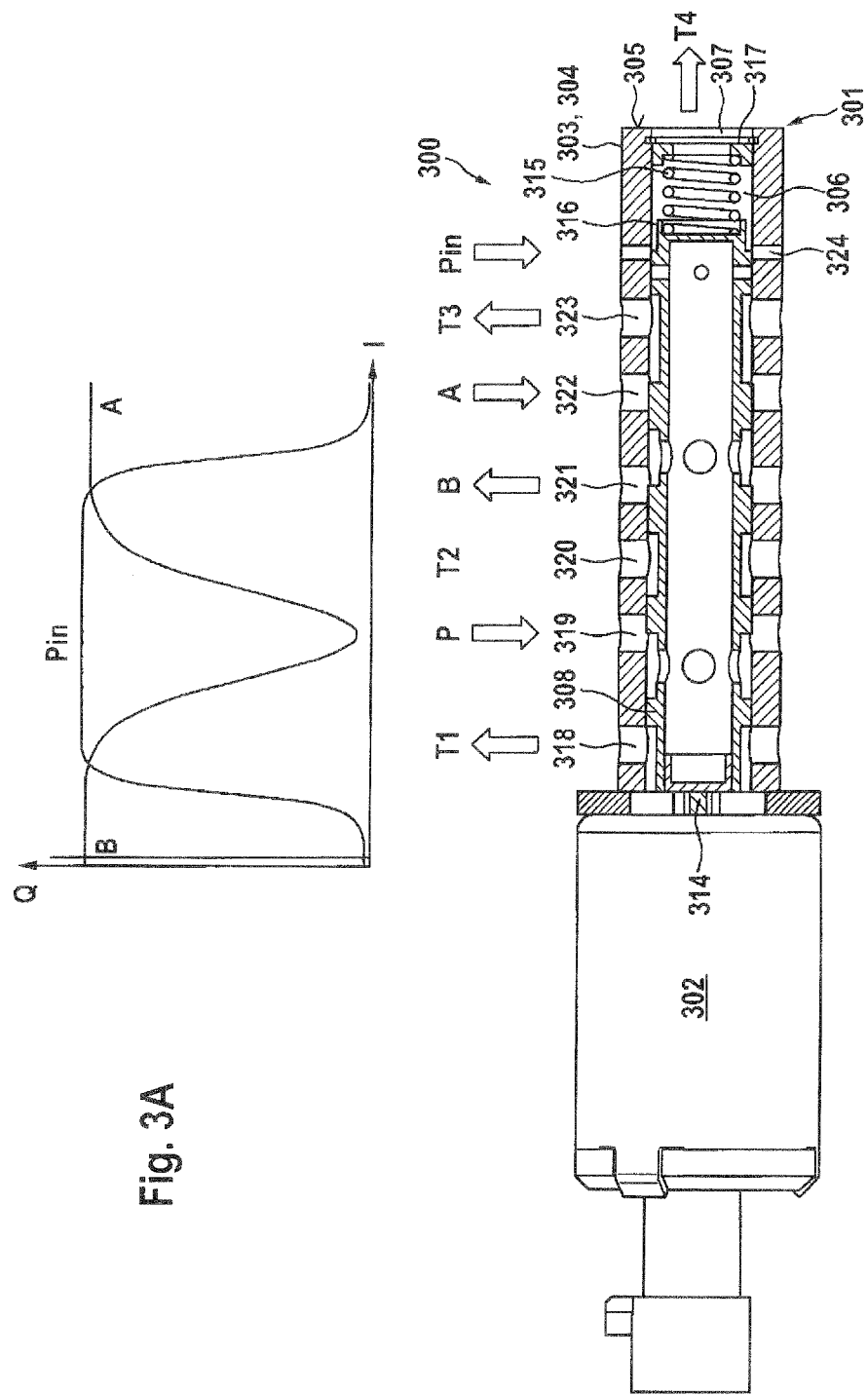

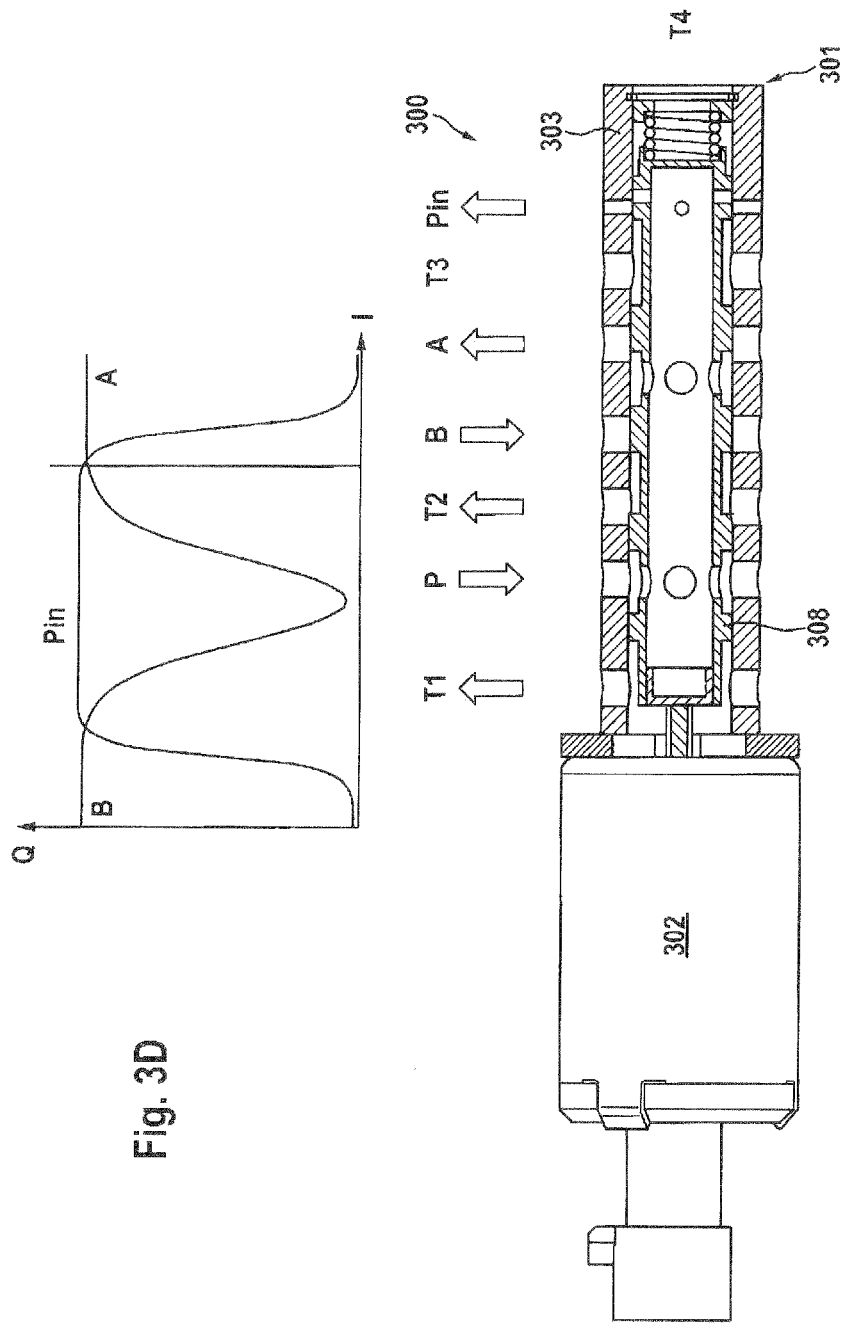

CONTROL VALVES FOR CONTROLLING PRESSURE MEDIUM FLOWS

This application is a continuation of PCT/EP2010/050974 filed Jan. 28, 2010, which in turn claims the priority of DE 10 2009 008 056.2 filed Feb. 9, 2009. The priority of both applications is hereby claimed and both applications are incorporated by reference herein.

FIELD OF THE INVENTION

The invention is in the technical field of internal combustion engines and relates to control valves for controlling pressure medium flows for phase adjusters, in particular camshaft adjusters, of internal combustion engines.

In internal combustion engines with a mechanical valve drive, gas exchange valves are actuated by the cams of a camshaft which is driven by a crankshaft, wherein the control times of the gas exchange valves can be defined by means of the arrangement and shape of the cams. The control times of the gas exchange valves can be influenced as a function of the operating state of the internal combustion engine by means of a variation of the phase relationship between the crankshaft and camshaft, as a result of which advantageous effects can be attained, for example a reduction in fuel consumption and pollutant generation. The use of special devices for varying the phase relationship between the crankshaft and camshaft in internal combustion engines is well known, these devices being referred to usually as camshaft adjusters by experts in the technical field.

In general, camshaft adjusters comprise a drive input part, which is drive-connected to the crankshaft via a drive input wheel, and a drive output part, which is fixed to the camshaft, and an adjusting mechanism which couples the drive input part and drive output part to one another and which transmits the torque from the drive input part to the drive output part and permits adjustment and fixing of the phase relationship between these. In camshaft adjusters with a hydraulic adjusting mechanism, at least one pressure chamber with a pressure chamber pair which act counter to one another is formed between the drive input part and drive output part, wherein the drive input part and drive output part can be adjusted relative to one another, in order to effect a change in the phase relationship between the camshaft and crankshaft, by means of corresponding pressurization of the pressure chambers.

In modern internal combustion engines, hydraulic actuating mechanisms are controlled by an electronic control unit which regulates the inflow and outflow of pressure medium, generally by means of an electromagnetic control valve, on the basis of detected characteristic data of the internal combustion engine. In a typical design, electromagnetic control valves comprise a (hydraulic) valve part with an axially movably held control piston which can be moved counter to the spring force of a restoring spring element by an electromagnetically movable plunger. Such control valves are themselves well known and are described in detail for example in the German patent DE 19727180 C2, the German patent DE 19616973 C2, the European patent application EP 1 596 041 A2 and the German laid-open specification DE 102 39 207 A1 from the applicant.

During the operation of the internal combustion engine, alternating and drag torques act on the camshaft, which torques act on the drive output part which is connected to the camshaft for conjoint rotation therewith. In the event of an inadequate supply of pressure medium, such as is the case for example during the starting phase or at idle, the drive input part and drive output part are moved relative to one another in an uncontrolled manner by the alternating torques, thereby promoting wear and causing objectionable noises. Furthermore, in said situation, the phase relationship between the crankshaft and camshaft fluctuates intensely, such that the internal combustion engine does not start or at least does not run smoothly.

To prevent the transmission of alternating torques, use is made of hydraulic camshaft adjusters with a locking device for locking the drive input part and drive output part for conjoint rotation in the base position. Such a locking device typically comprises at least one pin which is held in the drive input or drive output part and which is forced out of its receptacle by a compression spring and which, in the base position, can engage in a positively locking manner into a recess formed by the in each case other part. The pin can be hydraulically unlocked by being acted on with pressure medium on the end side. Locking of the drive input part and drive output part takes place in a phase relationship which is thermodynamically expedient for the starting of the internal combustion engine and which is dependent on the physical design of the internal combustion engine. An early, late or intermediate position, for example a mid-position, may be selected as a base position. In relation to the drive direction of the drive input part or camshaft, the late position corresponds to a maximum adjustment of the drive output part relative to the drive input part in a direction of rotation which opposes the drive direction (and in which the volumes of the leading pressure chambers—usually denoted as "B" chambers—are at a maximum), and the early position corresponds to a maximum rotation of the drive output part relative to the drive input part in a direction of rotation which is concurrent with the drive direction (and in which the volumes of the lagging pressure chambers—usually denoted as "A" chambers—are at a maximum). An intermediate position is situated between said two end phase relationships. The mid-position lies at least approximately in the middle between the early and late positions.

Hydraulic camshaft adjusters having a locking device for locking the drive input part and drive output part for conjoint rotation in the base position are themselves well known and are described in detail for example in the documents DE 20 2005 008 264 U1, EP 1 596 040 A2, DE 10 2005 013 141 A1, DE 199 08 934 A1 and WO 2006/039966 from the applicant.

As emerges in particular from the latter document, it is routine practice in hydraulic camshaft adjusters with locking in the mid-position for the drive output part to be placed, during the shut-down of the internal combustion engine, into a phase relationship adjusted in the "early" direction in relation to the mid-position. The drive output part is therefore automatically driven into the mid-position, and locked there, by the drag torques of the camshaft during the starting of the internal combustion engine. However, if such an early phase relationship is not attained during the shut-down of the internal combustion engine, for example as a result of "stalling" of the engine, the drive output part is automatically adjusted in the "late" direction, such that locking in the mid-position is not possible. Therefore, for locking in the mid-position, special measures must be taken in order to adjust the drive output part from a late phase relationship into the base position. Torsion springs, for example, are provided for this purpose in hydraulic camshaft adjusters, by means of which torsion springs the drive output part is preloaded relative to the drive input part in the direction of the desired base position.

To dispense with additional measures for the adjustment of the drive input part and drive output part into the base position, it would be desirable if, during the shut-down of the internal combustion engine, a hydraulic adjustment in the "early" direction for locking in the mid-position were also possible from a late phase relationship. However, for example in the camshaft adjuster presented in WO 2006/039966, the two pins for locking the drive input part and drive output part for conjoint rotation are acted on with pressure medium in such a way that the pin which inhibits an early adjustment is hydraulically unlocked during an adjustment of the drive output part in the "early" direction, and the pin which inhibits a late adjustment is hydraulically unlocked during an adjustment of the drive output part in the "late" direction. Accordingly, during a hydraulic adjustment in the "early" direction, the pin which inhibits an early adjustment is unlocked, such that the drive output part is adjusted beyond the mid-position without said pin locking, and locking of the drive input part and drive output part for conjoint rotation in the mid-position is not possible.

SUMMARY OF THE INVENTION

In contrast to this, the present invention, which relates generally to hydraulic camshaft adjusters, to permit locking of the drive input part and drive output part for conjoint rotation in the base position by means of a hydraulic adjustment of the drive output part in the "early" direction, without further measures for adjusting the drive input part and drive output part into the base position.

According to a first aspect of the invention, a control valve for controlling pressure medium flows is presented which serves in particular for controlling pressure medium flows of a hydraulic phase adjuster, in particular camshaft adjuster, which is provided with a locking device for locking the drive input part and drive output part for conjoint rotation in a base position which differs from the late position.

The control valve comprises a cylindrical valve housing having a housing cavity which is open at one side and which is provided with an axial outflow port (T), a radial first working port (B), a radial second working port (A), a radial third working port (Pin) and two radial pressure ports (P1, P2), which open in each case into the housing cavity. Here, in the axial direction, a first pressure port (P1) is arranged between the first working port (B) and the second working port (A) and a second pressure port (P2) is arranged between the second working port (A) and the third working port (Pin). The ports may be formed for example in each case in the manner of an annular groove with radial openings formed therein, which open into the housing cavity.

The first working port (B) and the second working port (A) are provided for example for connecting to pressure chambers, which act counter to one another, of the hydraulic phase adjuster. The third working port (Pin) is provided for example for hydraulically loading at least one pin for locking the drive input part and drive output part for conjoint rotation in the base position. The two radial pressure ports (P1, P2) are provided for connecting to a pressure medium pump. The outflow port is provided for connecting to a pressure medium tank.

The control valve also comprises a cylindrical control piston which is held in an axially movable manner in the housing cavity and which has a piston cavity open at one side toward the axial outflow port (T), the control piston being designed such that, as a result of the axial displacement thereof, the first working port (B) can be connected in fluid-conducting fashion selectively to the first pressure port (P1) and the outflow port (T), the second working port (A) can be connected in fluid-conducting fashion selectively to the first pressure port (P1) and the outflow port (T), the third working port (Pin) can be connected in fluid-conducting fashion selectively to the second pressure port (P2) and the outflow port (T), wherein, in a first piston position, the first working port (B) is connected in fluid-conducting fashion to the first pressure port (P1) and at the same time the third working port (Pin) is connected in fluid-conducting fashion to the outflow port (T), and, in a second piston position, the second working port (A) is connected in fluid-conducting fashion to the first pressure port (P1) and at the same time the third working port (Pin) is connected in fluid-conducting fashion to the outflow port (T).

In one advantageous embodiment of the control valve according to the invention, the third working port (Pin) is provided with a first port section and, axially spaced apart from the first port section, a second port section, wherein the control piston has:

a first control section which, in the first piston position, connects the first working port (B) to the first pressure port (P1) and, in the second piston position, connects the second working port (A) to the first pressure port (P1), a second control section which, in the first piston position, connects the first port section to the outflow port (T) and, in the second piston position, connects the second port section to the outflow port (T).

In a further advantageous embodiment of the control valve according to the invention, the control piston is designed such that, in a third piston position, the second working port (A) is connected in fluid-conducting fashion to the first pressure port (P1) and at the same time both the first working port (B) and also the third working port (Pin) are connected in fluid-conducting fashion to the outflow port (T).

In a further advantageous embodiment of the control valve according to the invention, the control piston is designed such that, in a fourth piston position, both the first working port (B) and also the second working port (A) are blocked and at the same time the third working port (Pin) is connected in fluid-conducting fashion to the second pressure port (P2).

In a further advantageous embodiment of the control valve according to the invention, the control piston is designed such that, in a fifth piston position, the first working port (B) is connected in fluid-conducting fashion to the first pressure port (P1) and at the same time both the second working port (A) and also the third working port (Pin) are connected in fluid-conducting fashion to the outflow port (T).

In a further advantageous embodiment of the control valve according to the invention, the valve housing is held in a valve sleeve which is provided with a pressure medium line which connects the two pressure ports (P1, P2) to one another in terms of flow.

According to a second aspect of the invention, a control valve for controlling pressure medium flows is presented which serves in particular for controlling pressure medium flows of a hydraulic phase adjuster, in particular camshaft adjuster, which is provided with a locking device for locking the drive input part and drive output part for conjoint rotation in a base position which differs from the late position.

The control valve comprises a cylindrical valve housing having a housing cavity which is open at one side and which is provided with an axial outflow port (T). Said control valve also comprises a valve sleeve which surrounds the valve housing and which is provided with a radial first working port (B), a radial second working port (A), a radial third working port (Pin) and a radial pressure port (P) which, penetrating through the valve housing, open in each case into the housing cavity. Here, in the axial direction, the pressure port (P) is arranged between the first working port (B) and the second working port (A). Furthermore, the valve sleeve is provided with a pressure medium line for connecting the pressure medium port (P) to the third working port (Pin) in terms of flow.

The control valve also comprises a cylindrical control piston which is held in an axially movable manner in the housing cavity and which has a piston cavity open at one side toward the outflow port (T), the control piston being designed such that, as a result of the axial displacement thereof,
- the first working port (B) can be connected in fluid-conducting fashion selectively to the pressure port (P) and the outflow port (T),
- the second working port (A) can be connected in fluid-conducting fashion selectively to the pressure port (P) and the outflow port (T),
- the third working port (Pin) can be connected in fluid-conducting fashion selectively to the pressure port (P) and the outflow port (T), wherein, in a first piston position, the first working port (B) is connected in fluid-conducting fashion to the pressure port (P) and at the same time the third working port (Pin) is connected in fluid-conducting fashion to the outflow port (T), and, in a second piston position, the second working port (A) is connected in fluid-conducting fashion to the pressure port (P) and at the same time the third working port (Pin) is connected in fluid-conducting fashion to the outflow port (T).

In an advantageous embodiment of the control valve according to the invention, the control piston is designed such that, in a third piston position, the second working port (A) is connected in fluid-conducting fashion to the pressure port (P) and at the same time both the first working port (B) and also the third working port (Pin) are connected in fluid-conducting fashion to the outflow port (T).

In a further advantageous embodiment of the control valve according to the invention, the control piston is designed such that, in a fourth piston position, both the first working port (B) and also the second working port (A) are blocked and at the same time the third working port (Pin) is connected in fluid-conducting fashion to the pressure port (P).

In a further advantageous embodiment of the control valve according to the invention, the control piston is designed such that, in a fifth piston position, the first working port (B) is connected in fluid-conducting fashion to the pressure port (P) and at the same time both the second working port (A) and also the third working port (Pin) are connected in fluid-conducting fashion to the outflow port (T).

According to a third aspect of the invention, a control valve for controlling pressure medium flows is presented which serves in particular for controlling pressure medium flows of a hydraulic phase adjuster, in particular camshaft adjuster, which is provided with a locking device for locking the drive input part and drive output part for conjoint rotation in a base position which differs from the late position.

The control valve comprises a cylindrical valve housing having a housing cavity which is open at one side and which is provided with an axial outflow port (T4), a radial first working port (B), a radial second working port (A), a radial third working port (Pin), a radial pressure port (P) and three radial outflow ports (T1-T3), which open in each case into the housing cavity (306). Here, in the axial direction, the pressure port (P) is arranged between a first outflow port (T1) and a second outflow port (T2), the first working port (B) and the second working port (A) are arranged between the second outflow port (T2) and a third outflow port (T3).

The control valve also comprises a cylindrical control piston which is held in an axially movable manner in the housing cavity and which has a piston cavity (311), the control piston being designed such that, as a result of the axial displacement thereof,
- the first working port (B) can be connected in fluid-conducting fashion selectively to the pressure port (P) and the second outflow port (T2),
- the second working port (A) can be connected in fluid-conducting fashion selectively to the pressure port (P) and the third outflow port (T3),
- the third working port (Pin) can be connected in fluid-conducting fashion selectively to the pressure port (P) and the axial outflow port (T4), wherein, in a first piston position, the first working port (B) is connected in fluid-conducting fashion to the pressure port (P) and at the same time the third working port (Pin) is connected in fluid-conducting fashion to the axial outflow port (T4), and, in a second piston position, the second working port (A) is connected in fluid-conducting fashion to the pressure port (P) and at the same time the third working port (Pin) is connected in fluid-conducting fashion to the axial outflow port (T4).

In one advantageous embodiment of the control valve according to the invention, the control piston is designed such that, in a third piston position, the second working port (A) is connected in fluid-conducting fashion to the pressure port (P) and at the same time both the first working port (B) is connected in fluid-conducting fashion to the second outflow port (T2) and also the third working port (Pin) is connected in fluid-conducting fashion to the axial outflow port (T4).

In a further advantageous embodiment of the control valve according to the invention, the control piston is designed such that, in a fourth piston position, both the first working port (B) and also the second working port (A) are blocked and at the same time the third working port (Pin) is connected in fluid-conducting fashion to the pressure port (P).

In a further advantageous embodiment of the control valve according to the invention, the control piston is designed such that, in a fifth piston position, the first working port (B) is connected in fluid-conducting fashion to the pressure port (P) and at the same time both the second working port (A) is connected in fluid-conducting fashion to the third outflow port (T3) and also the third working port (Pin) is connected in fluid-conducting fashion to the axial outflow port (T4).

The invention also encompasses a hydraulic phase adjuster, for example camshaft adjuster, which has at least one control valve as described above.

The invention also encompasses an internal combustion engine equipped with at least one hydraulic phase adjuster, in particular camshaft adjuster, as described above.

BRIEF DESCRIPTION OF THE DRAWINGS

The invention will now be explained in more detail on the basis of exemplary embodiments, with reference being made to the appended drawings. Identically or functionally identical elements are denoted by the same reference numerals in the drawings, in which:

FIGS. 1A-1E show axial sectional views through an exemplary control valve according to the first aspect of the invention;

FIGS. 3A-3E show axial sectional views of an exemplary control valve according to the third aspect of the invention;

DETAILED DESCRIPTION OF THE DRAWINGS

Figure 1B:
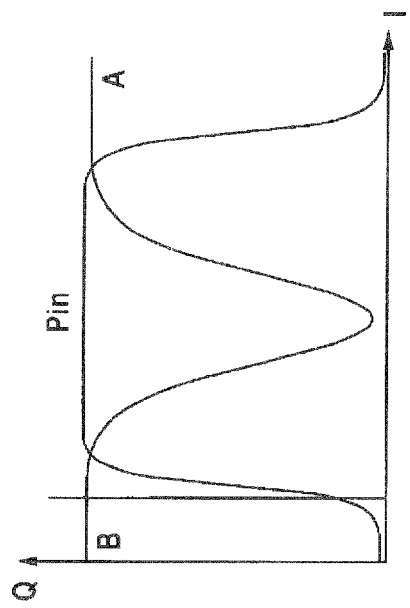
Figure 1B:
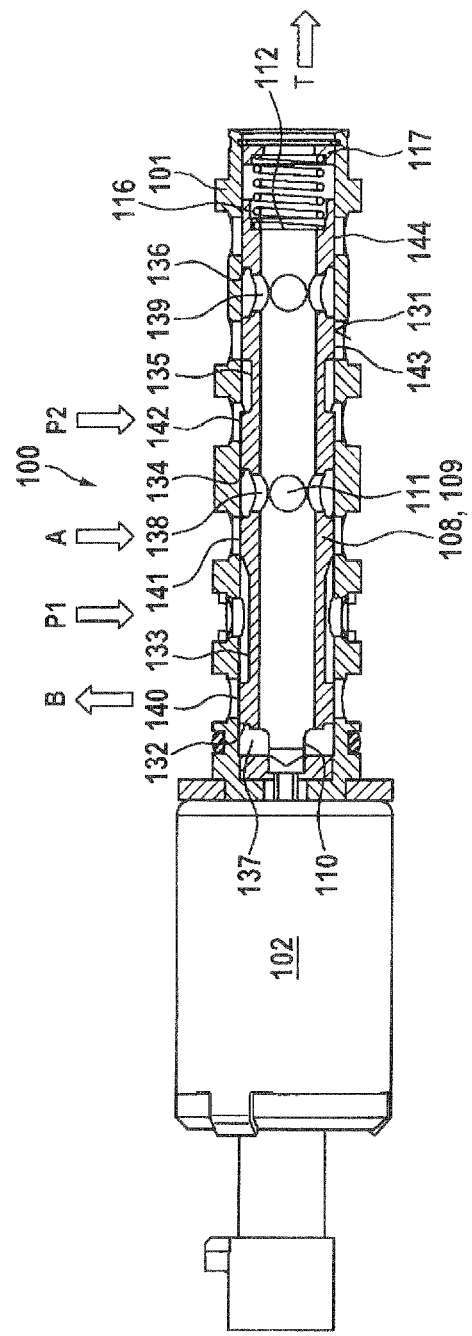

With reference to FIGS. 1A-1E, 2A-2E and 3A-3E, electromagnetic control valves will be described which can be used for regulating pressure medium flows in hydraulic phase adjusters, in particular hydraulic camshaft adjusters. Without intending to restrict the invention to this, it shall be assumed that the control valves explained in the exemplary embodiments serve for regulating pressure medium flows in hydraulic rotary piston adjusters.

As is known per se to a person skilled in the art, hydraulic rotary piston adjusters comprise an outer rotor as a drive input part and an inner rotor, which is concentric with respect to the outer rotor, as a drive output part, which outer rotor and inner rotor are arranged such that they can be adjusted in rotation relative to one another, wherein in the radial intermediate space between the outer and inner rotors, pressure chambers are formed by one of the two rotors, into which pressure chambers extends in each case a vane connected to the other rotor, as a result of which the pressure chambers are divided in each case into a pair of pressure chambers which act counter to one another (pressure chamber "A," which lags in the drive direction, and pressure chamber "B," which leads in the drive direction). For locking the outer rotor and inner rotor for conjoint rotation in the base position, in this case for example the mid-position, at least one pin is provided which is held in one of the two rotors, which is forced out of its receptacle by a spring element and which can engage in a positively locking manner into a recess formed by the respective other rotor. The pin may be hydraulically unlocked by being acted on, on the end side with pressure medium.

Consideration shall be given firstly to FIGS. 1A-1E, which show in each case axial sectional views of a first exemplary embodiment of the invention.

In this, the control valve 100 is composed of a (hydraulic) valve part 101 and an electromagnet 102 which serves for actuating the valve part 101. The valve part 101 comprises a substantially hollow cylindrical valve housing 103 with a housing jacket 104 extending in the axial direction and with a housing base 105 arranged perpendicular to the axial direction, wherein the housing jacket 104 and housing base 105 together surround a housing cavity 106 which is open at one side and which has an axial housing cavity opening 107.

Coaxially with respect to the valve housing 103, a substantially hollow cylindrical control piston 108 is held in an axially movable manner in the housing cavity 106. The control piston 108, which is formed in the manner of a hollow piston, comprises a piston jacket 109 extending in the axial direction and an axially tapering piston lug 110 arranged perpendicular to the axial direction. The piston jacket 109 and the piston lug 110 together border a piston cavity 111 which is open at one side and which has an axial piston cavity opening 112 on the side of the axial housing cavity opening 107. The piston jacket 109 is matched in terms of its radial dimension to the inner circumference of the housing jacket 104.

That end surface 113 of the piston lug 110 of the control piston 108 which is at the left in FIGS. 1A-1E is engaged on by a valve plunger 114 which is fastened rigidly to a magnet armature (not illustrated) of the electromagnet 102. When the magnet armature is electrically energized, the valve plunger 114 is displaced axially and, here, adjusts the control piston 108 in the axial direction counter to the spring force of a helical compression spring 115. The helical compression spring 115 is supported for this purpose with one end thereof against a first annular step 116 of the control piston 108 and with the other end thereof against a second annular step 117 of the valve housing 103. If the magnet armature is electrically de-energized, the helical compression spring 115 returns the control piston 108 into its initial position (to the left in FIGS. 1A-1E).

Six encircling housing annular grooves 119-124 which are axially spaced apart from one another are formed into a housing outer circumferential surface 118 of the housing jacket 104, which housing annular grooves are provided in each case with a multiplicity of housing radial openings 125-130 which are distributed uniformly about the circumference and which open into the housing cavity 106.

Corresponding to the port allocation specified in FIGS. 1A-1E,
a first housing annular groove 119 with the first housing radial openings 125 serves as a (first) working port B for connecting to the pressure chambers B which effect an adjustment of the inner rotor relative to the outer rotor in the "late" direction,
a second housing annular groove 120 with the second housing radial openings 126 serves as a (first) inflow port P1 for connecting to a pressure medium pump,
a third housing annular groove 121 with the third housing radial openings 127 serves as a (second) working port A for connecting to the pressure chambers A which effect an adjustment of the inner rotor relative to the outer rotor in the "early" direction,
a fourth housing annular groove 122 with the fourth housing radial openings 128 serves as a (second) inflow port P2 for connecting to the pressure medium pump,
a fifth housing annular groove 123 with the fifth housing radial openings 129 and a sixth housing annular groove 124 with the sixth housing radial openings 130 serves as a (common) pin port Pin.

Furthermore, the axial housing cavity opening 107 serves as an axial outflow port T for connecting to a pressure medium tank.

A piston outer circumferential surface 131 of the piston jacket 109 has formed into it four encircling piston annular grooves which are axially spaced apart: a first piston annular groove 133, a second piston annular groove 134, a third piston annular groove 135 and a fourth piston annular groove 136. A piston recess 132 is formed by the axially tapering piston lug 110. First to third piston radial openings 137-139 which open into the piston cavity 111 are formed, so as to be uniformly distributed about the circumference, into the piston recess 132, the second piston annular groove 134 and the fourth piston annular groove 136.

A first annular web 140 formed by the piston recess 132 and the first piston annular groove 133 is provided with a first control edge 145 and a second control edge 146. A second annular web 141 formed by the first piston annular groove 133 and the second piston annular groove 134 is provided with a third control edge 147 and a fourth control edge 148. A third annular web 142 formed by the second piston annular groove 134 and the third piston annular groove 135 is provided with a fifth control edge 149. A fourth annular web 143 formed by the third piston annular groove 135 and the fourth piston annular groove 136 is provided with a sixth control edge 150 and a seventh control edge 151. A fifth annular web 144 formed by the fourth piston annular groove 136 and that face-side end of the piston jacket section 109 which is situated opposite the piston lug 110 is provided with an eighth control edge 152. The first to fifth annular webs 140-144 serve in particular for axially guiding the control piston 108 within the valve housing 103.

The circumferential surface of the first annular web 140 is formed such that, during an axial displacement of the control piston 108, said circumferential surface can sealingly cover or open up the working port B in order thereby, by means of a change in the opening cross sections of the first housing radial openings 125, to regulate the amount of pressure medium flowing though, wherein an adjustment of the opening cross sections is realized by means of the first control edge 145 and the second control edge 146 of the first annular web 140. Here, a pressure medium duct, formed by the piston recess 132 and the first piston radial openings 137, to the axial outflow port T can be controlled by means of the first control edge 145, and a pressure medium duct, formed by the first piston annular groove 133, to the inflow port P1 can be controlled by means of the second control edge 146.

The circumferential surface of the second annular web 141 is formed such that, during an axial displacement of the control piston 108, said circumferential surface can sealingly cover or open up the working port A in order thereby, by means of a change in the opening cross sections of the third housing radial openings 127, to regulate the amount of pressure medium flowing though, wherein an adjustment of the opening cross sections is realized by means of the third control edge 147 and the fourth control edge 148 of the second annular web 141. Here, a pressure medium duct, formed by the first piston annular groove 133, to the inflow port P1 can be controlled by means of the third control edge 147, and a pressure medium duct, formed by the second piston annular groove 134 and the second piston radial openings 138, to the outflow port T can be controlled by means of the fourth control edge 148.

The circumferential surface of the third annular web 142 is formed such that, during an axial displacement of the control piston 108, said circumferential surface can sealingly cover or open up the inflow port P2 in order thereby, by means of a change in the opening cross sections of the fourth radial openings 128, to regulate the amount of pressure medium flowing though, wherein an adjustment of the opening cross sections of the fourth housing radial openings 128 is realized by means of the fifth control edge 149 of the third annular web 142. A pressure medium duct to the fifth housing radial opening 129 and therefore to the pin port Pin can be controlled by means of the third piston annular groove 135.

The circumferential surface of the fourth annular web 143 is formed such that, during an axial displacement of the control piston 108, said circumferential surface can sealingly cover or open up the fifth housing radial openings of the pin port Pin in order thereby, by means of a change in the opening cross sections, to regulate the amount of pressure medium flowing though. An adjustment of the opening cross sections is realized by means of the sixth control edge 150 and the seventh control edge 151 of the fourth annular web 143. Here, a pressure medium duct, formed by the third piston annular groove 135, to the inflow port P2 can be controlled by means of the sixth control edge 150, and a pressure medium duct, formed by the fifth piston annular groove 136 and the third piston radial openings 139, to the outflow port T can be controlled by means of the seventh control edge 151.

The circumferential surface of the fifth annular web 144 is formed such that, during an axial displacement of the control piston 108, said circumferential surface can sealingly cover or open up the sixth housing radial openings 130 of the pin port Pin in order thereby, by means of a change in the opening cross sections, to regulate the amount of pressure medium flowing though, wherein an adjustment of the opening cross sections is realized by means of the eighth control edge 152 of the fifth annular web 144. Here, a pressure medium duct, formed by the fourth piston annular groove 136 and the associated third piston radial openings 139, to the outflow port T can be controlled by means of the eighth control edge 152.

Therefore, with the port allocation shown in FIGS. 1A-1E, it is possible by means of the axial displacement of the control piston 108 for a flow connection between the working port B and the inflow port P1 or the outflow port T,
the working port A and the inflow port P1 or the outflow port T,
the pin port Pin and the inflow port P2 or the outflow port T, to be selectively controlled.

Different positions of the control piston 108 will now be explained on the basis of FIGS. 1A-1E.

Also illustrated in FIGS. 1A-1F, in each case on the basis of a diagram, is the qualitative profile of a volume flow characteristic curve of the control valve 100, wherein a volume flow (Q) for acting on the pressure chambers A, the pressure chambers B and the at least one pin with pressure medium is plotted versus an electrical current value (I) for the electrical energization of the magnet armature of the electromagnet 102. Here, the electrical current value I is a measure for the magnitude of the displacement of the control piston 108 counter to the spring force of the helical compression spring 115. The present position of the control piston 108 is plotted in each case as a line in the diagram.

FIG. 1A shows a position of the control piston 108 in which the magnet armature of the electromagnet 102 is electrically de-energized. As indicated by the corresponding arrows, in said position of the control piston 108, the working port B is connected in terms of flow to the inflow port P1 via the first piston annular groove 133, whereas the working port A is connected in terms of flow to the outflow port T via the second piston annular groove 134 and the second piston radial openings 138. Furthermore, the fifth housing radial bore 129 of the pin port Pin is connected in terms of flow to the outflow port T via the fourth piston annular groove 136 and the third piston radial openings 139.

Accordingly, in said position of the control piston 108, the working port B is acted on with a maximum volume flow, whereas both the working port A and also the pin port Pin are not acted on (zero volume flow). Since the pressure chambers A lead in the drive direction, said position of the control piston 108 can be utilized for a late adjustment of the inner rotor relative to the outer rotor, wherein as it passes the base position, the pin can lock in order to lock the inner and outer rotors for conjoint rotation.

FIG. 1B shows a further position of the control piston 108 in which the magnet armature of the electromagnet 102 is electrically energized with a non-zero current of value I1, such that the control piston 108 is displaced (to the right in FIGS. 1A-1E) counter to the spring force of the helical compression spring 115 by the action of the valve plunger 114. As indicated by the corresponding arrows, in said position, the working port B is connected in terms of flow to the inflow port P1 via the first piston annular groove 133, whereas the working port A is connected in terms of flow to the outflow port T via the second piston annular groove 134 and the second piston radial openings 137. The fifth housing radial opening 129 of the pin port Pin is now separated from the outflow port T and is connected in terms of flow to the inflow port P2 via the fourth piston annular groove 135.

Corresponding to the flow conditions, the working port B continues to be acted on to a maximum extent with pressure medium and the pin port Pin is acted on with a smaller volume flow.

FIG. 1C shows a further position of the control piston 108 in which the magnet armature of the electromagnet 102 is electrically energized with a higher current of value I2 (I2>I1), such that the control piston 108 is displaced yet further counter to the spring force of the helical compression spring 115 by the action of the valve plunger 114. In said position, the working port A and the working port B are separated both from the inflow port P1 and also from the outflow port T. At the same time, the fifth housing radial opening 129 of the pin port Pin is connected in terms of flow to the inflow port P2 via the third piston annular groove 135.

Corresponding to the flow conditions, the two working ports A and B have in the volume flow characteristic curve only a minimal volume flow arising from leakage flows, whereas the pin port Pin is acted on with pressure medium to a maximum extent. Said position of the control piston 108 may be used to fix a phase relationship between the outer and inner rotors.

Figure 1D:
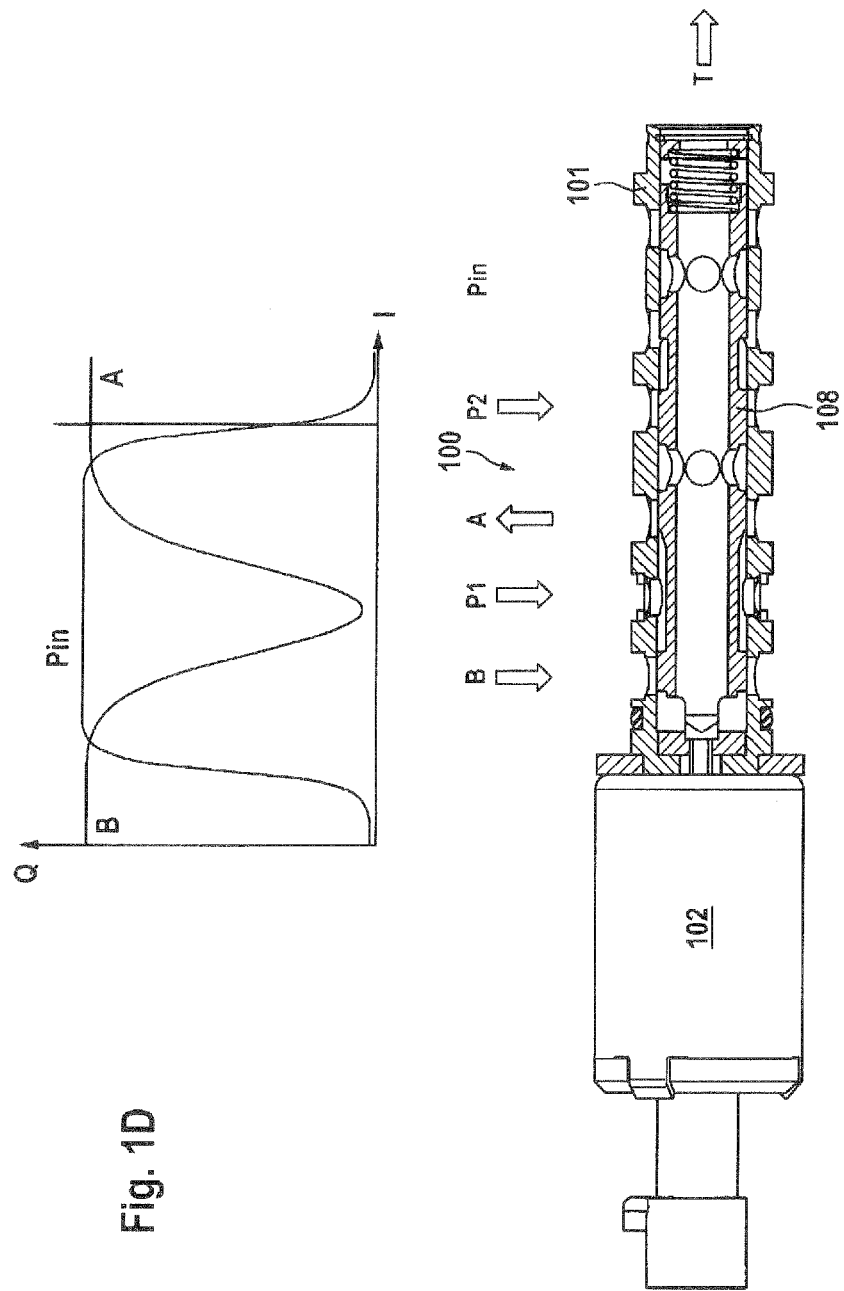

FIG. 1D shows a further position of the control piston 108 in which the magnet armature of the electromagnet 102 is electrically energized with a yet higher current of value I3 (I3>I2), such that the control piston 108 is displaced yet further counter to the spring force of the helical compression spring 115 by the action of the valve plunger 114. As specified, in said position, the working port A is connected in terms of flow to the inflow port P1 via the first piston annular groove 133, whereas the working port B is connected in terms of flow to the outflow port T via the piston recess 132 and the first piston radial openings 137. Furthermore, a volume flow of the flow connection between the fifth housing radial openings 129 of the pin port Pin and the inflow port P2 is progressively reduced by the fifth control edge 149 of the third annular web 142.

Corresponding to the flow conditions, the working port A is acted on to a maximum extent with pressure medium whereas the pin port Pin is acted on to a significantly lesser extent with pressure medium.

Figure 1E:
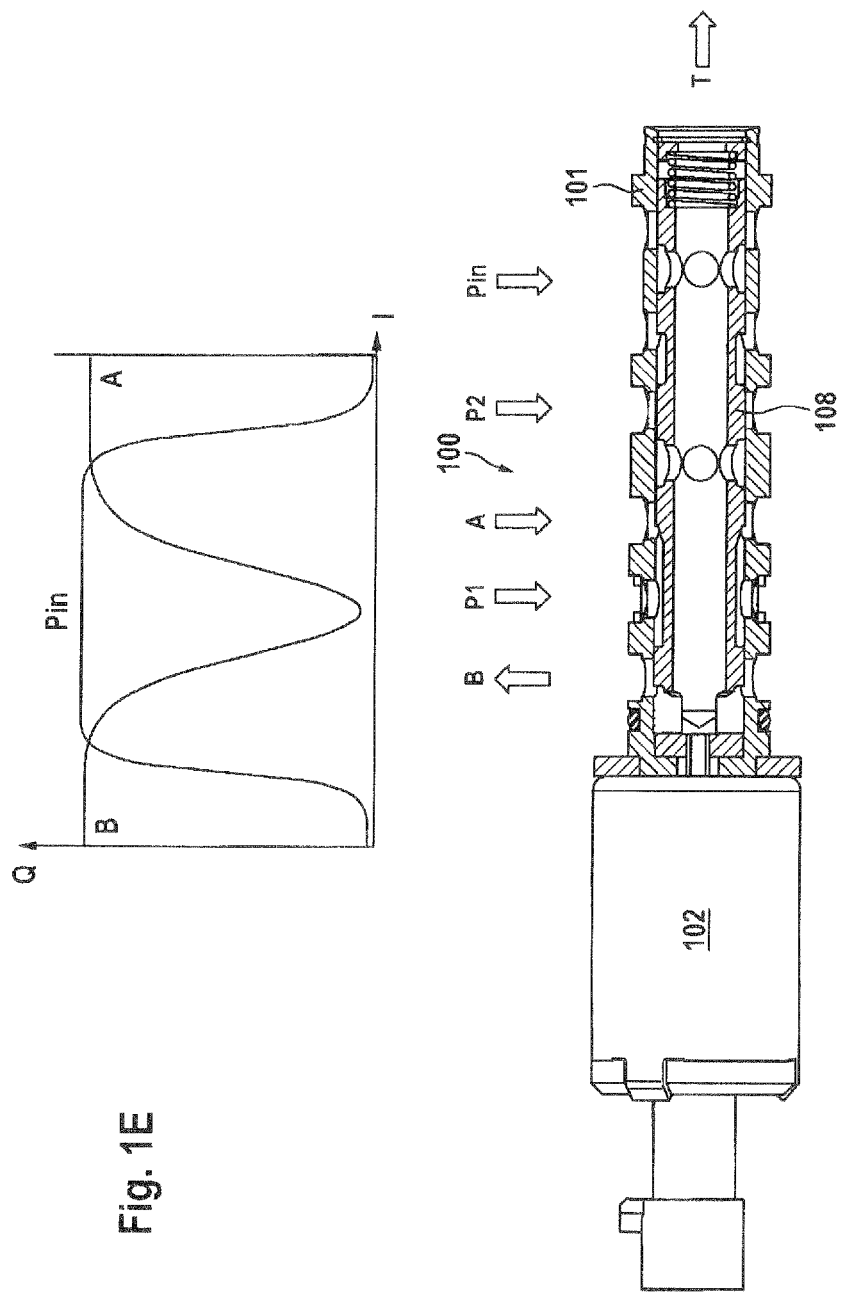

Finally, FIG. 1E shows a further position of the control piston 108 in which the magnet armature of the electromagnet 102 is electrically energized with a yet higher current of value I4 (I4>I3), such that the control piston 108 is displaced yet further, corresponding to a maximum deflection, counter to the spring force of the helical compression spring 115 by the action of the valve plunger 114. As stated, in said position, the working port A is connected in terms of flow to the inflow port P1 via the first piston annular groove 133, whereas the working port B is connected in terms of flow to the outflow port T via the piston recess 132 and the first piston radial openings 137. Furthermore, the sixth housing radial opening 130 of the pin port Pin is connected in terms of flow to the outflow port T via the fourth piston annular groove 136 and the third piston radial openings 139.

Corresponding to said flow conditions, the working port A is acted on to a maximum extent with pressure medium, whereas the volume flow of the pin port Pin is zero. Said position of the control piston 108 may be used for an early adjustment of the inner rotor relative to the outer rotor, wherein when it reaches the base position, the pin can lock in order to lock the outer and inner rotors for conjoint rotation.

The control valve 100 therefore makes it possible, both in the case of hydraulic late adjustment and also in the case of hydraulic early adjustment of the inner rotor relative to the outer rotor, for the outer and inner rotors to be locked for conjoint rotation in a base position offset in the "early" direction in relation to the late position, for example in a mid-position. Since the inner rotor can be adjusted hydraulically into the base position from any phase relationship, no additional measures are necessary for adjusting the inner rotor into the base position, such that installation space and costs can advantageously be saved.

Consideration shall now be given to FIGS. 2A-2E, which show in each case axial sectional views of a second example of a control valve according to the invention.

In this, the electromagnetic control valve 200 is composed of a (hydraulic) valve part 201 and an electromagnet 202 which serves as an actuator. The hydraulic valve part 201 comprises a substantially hollow cylindrical valve housing 203 with a housing jacket 204 which extends in the axial direction and with a housing pedestal 205 which is provided with an axial bore and which is held partially in the electromagnet 202. The housing jacket 204 and housing pedestal 205 together form a housing cavity 206 which is open at one side and which has an axial housing cavity opening 207.

Coaxially with respect to the valve housing 203, a substantially hollow cylindrical control piston 208 is held in an axially movable manner in the housing cavity 206. The control piston 208, which is formed in the manner of a hollow piston, comprises a piston jacket 209 extending in the axial direction and, as an end section, a piston crown 210 which tapers conically in the axial direction toward the electromagnet 202. The piston jacket 209 and piston crown 210 together border a piston cavity 211 which is open at one side and which has an axial piston cavity opening 212 on the side of the axial housing cavity opening 207. The piston jacket 209 is matched in terms of its radial dimension to the inner circumference of the housing jacket 204.

That end surface 213 of the piston crown 210 which is at the left in FIGS. 2A-2E is engaged on by a valve plunger 214 which is guided through the central bore of the housing pedestal 205 and which is fastened rigidly to a magnet armature (not illustrated) of the electromagnet 202. When the magnet armature is electrically energized, the valve plunger 214 is displaced in the axial direction and, here, adjusts the control piston 208 in the axial direction counter to the spring force of a helical compression spring 215. The helical compression spring 215 is supported for this purpose with one end thereof against a first annular step 216 of the control piston 208 and with the other end thereof against a second annular step 217 of the valve housing 203. If the magnet armature is electrically de-energized, the helical compression spring 215 returns the control piston 208 into its initial position (to the left in FIGS. 2A-2E).

The housing jacket 204 of the valve housing 203 is provided with five axially spaced-apart housing radial openings (first to fifth housing radial openings 219-223) which open out in each case into the housing cavity 206. Opposite the first to fifth housing radial openings 219-223, the housing jacket 204 is provided with two axially spaced-apart housing radial openings (sixth to seventh radial openings 224-225) which likewise open out in each case into the housing cavity 206.

A first housing annular groove 236, which is connected to the third housing radial opening 221, and a second housing annular groove 237, which is connected to the fifth housing radial opening 223, are formed into a housing inner circumferential surface 238.

The valve housing 203 is inserted with a housing outer circumferential surface 218 with an accurate fit into a sleeve cavity 226 of a hollow cylindrical valve sleeve 227 surrounding the valve housing. The valve sleeve 227 is provided with four sleeve radial openings (first to fourth sleeve radial openings 228-231) which are spaced apart in the axial direction and which open out in each case into the sleeve cavity 226. Opposite the first to fourth sleeve radial openings 228-231, the valve sleeve 227 is provided with two sleeve radial openings (fifth to sixth sleeve radial openings 232-233) which are axially spaced apart from one another and which open out in each case into the sleeve cavity 226.

Formed into a sleeve outer circumferential surface 234 of the valve sleeve 227 is an axial groove 235 which connects the fifth sleeve radial opening 232 and the sixth sleeve radial opening 233 to one another.

A first sleeve radial opening 228 is arranged in radial alignment with a first housing radial opening 219 and a second housing radial opening 220. A second sleeve radial opening 229 is arranged in radial alignment with a third housing radial opening 221. A third sleeve radial opening 230 is arranged in radial alignment with a fourth housing radial opening 222. A fourth sleeve radial opening 231 is arranged in radial alignment with a fifth housing radial opening 223. A fifth sleeve radial opening 232 is arranged in radial alignment with a sixth housing radial opening 224. A sixth sleeve radial opening 233 is arranged in radial alignment with a seventh housing radial opening 225.

Corresponding to the port allocation specified in FIGS. 2A-2E, the first sleeve radial opening 228 serves as a pin port Pin for connecting to the at least one pin for locking the rotor and stator for conjoint rotation in the base position, the second sleeve radial opening 229 with the third housing radial opening 221 serves as a (first) working port B for connecting to the pressure chambers B which effect an adjustment of the inner rotor relative to the outer rotor in the "late" direction, the third sleeve radial opening 230 with the fourth housing radial opening 222 serves as an inflow port P for connecting to a pressure medium pump, the fourth sleeve radial opening 231 with the fifth housing radial opening 223 serves as a (second) working port A for connecting to the pressure chambers A which effect an adjustment of the inner rotor relative to the outer rotor in the "early" direction.

Furthermore, the axial housing cavity opening 212 serves as an axial outflow port T for connecting to a pressure medium tank.

A piston outer circumferential surface 239 of the piston jacket 209 has formed into it three encircling piston annular grooves which are axially spaced apart, specifically a first piston annular groove 240, a second piston annular groove 241 and a third piston annular groove 242. Formed into the second piston annular groove 241 so as to be uniformly distributed about the circumference are first piston radial openings 243 which open out into the piston cavity 211. Furthermore, an annular recess 244 is formed into the piston outer circumferential surface 239 adjacent to the piston crown 210, which annular recess is provided with second piston radial openings 255 which are distributed uniformly about the circumference and which open out into the piston cavity 211.

A first annular web 245 formed by the annular recess 244 and the first piston annular groove 240 is provided with a first control edge 246 and a second control edge 247. A second annular web 248 formed by the first piston annular groove 240 and the second piston annular groove 241 is provided with a third control edge 249. A third annular web 250 formed by the second piston annular groove 241 and the third piston annular groove 242 is provided with a fourth control edge 251. A fourth annular web 252 formed by the third piston annular groove 241 and the face-side end of the piston jacket section 209 is provided with a fifth control edge 253 and a sixth control edge 254.

The first to fourth annular webs 245, 248, 250, 252 serve in particular for axially guiding the control piston 208 within the valve housing 203.

The circumferential surface of the first annular web 245 is formed such that, during an axial displacement of the control piston 208, said circumferential surface can sealingly cover or open up the first housing radial opening 219 in order thereby, by means of a change in the opening cross section of the first housing radial opening 219, to regulate the amount of pressure medium flowing through, wherein an adjustment of the opening cross section is realized by means of the first control edge 246. Here, a pressure medium duct, formed by the annular recess 244 and the second piston radial openings 256, to the axial outflow port T can be controlled by means of the first control edge 246.

The circumferential surface of the second annular web 248 is formed such that, during an axial displacement of the control piston 208, said circumferential surface can sealingly cover or open up the second housing radial opening 220 in order thereby, by means of a change in the opening cross section of the second housing radial opening 220, to regulate the amount of pressure medium flowing though, wherein an adjustment of the opening cross section is realized by means of the third control edge 249. Here, a pressure medium duct, formed by the second housing radial opening 220, the first piston annular groove 240, the seventh housing radial opening 225, the sixth housing radial opening 233, the axial groove 235, the fifth sleeve radial opening 232, the sixth housing radial opening 224 and the third piston annular groove 242, for connecting the pin port Pin to the inflow port P can be controlled by means of the third control edge 249 in conjunction with the second control edge 247.

The circumferential surface of the third annular web 250 is formed such that, during an axial displacement of the control piston 208, said circumferential surface can sealingly cover or open up the working port B in order thereby, by means of a change in the opening cross section of the third housing radial opening 221, to regulate the amount of pressure medium flowing though, wherein an adjustment of the opening cross section is realized by means of the fourth control edge 251. Here, a pressure medium duct, formed by the third piston annular groove 242, to the inflow port P and a pressure medium duct, formed by the second piston annular groove 241 and the first piston radial openings 243, to the outflow port T can be controlled.

The fourth housing radial opening 222 is connected to the sixth housing radial opening 224 by means of the third piston annular groove 242 in all positions of the control piston 208.

The circumferential surface of the fourth annular web 252 is formed such that, during an axial displacement of the control piston 208, said circumferential surface can sealingly cover or open up the working port A in order thereby, by means of a change in the opening cross section of the fifth housing radial opening 223, to regulate the amount of pressure medium flowing though, wherein an adjustment of the opening cross section is realized by means of the fifth control edge 253 and the sixth control edge 254. Here, a pressure medium duct, formed by the third piston annular groove 242, to the inflow port P and a pressure medium duct, formed by the housing cavity 206, to the outflow port T can be controlled.

Therefore, with the port allocation shown in FIGS. 2A-2E, it is possible by means of the axial displacement of the control piston 208 for a flow connection between the working port B and the inflow port P or the outflow port T, the working port A and the inflow port P or the outflow port T, and the pin port Pin and the inflow port P or the outflow port T, to be selectively controlled.

Different positions of the control piston 208 will now be explained on the basis of FIGS. 2A-2E, wherein in FIGS.

2A-2E (similarly to FIGS. 1A-1E), a qualitative profile of the volume flow characteristic curve of the control valve 200 is illustrated in each case by means of a diagram.

Figure 2A:
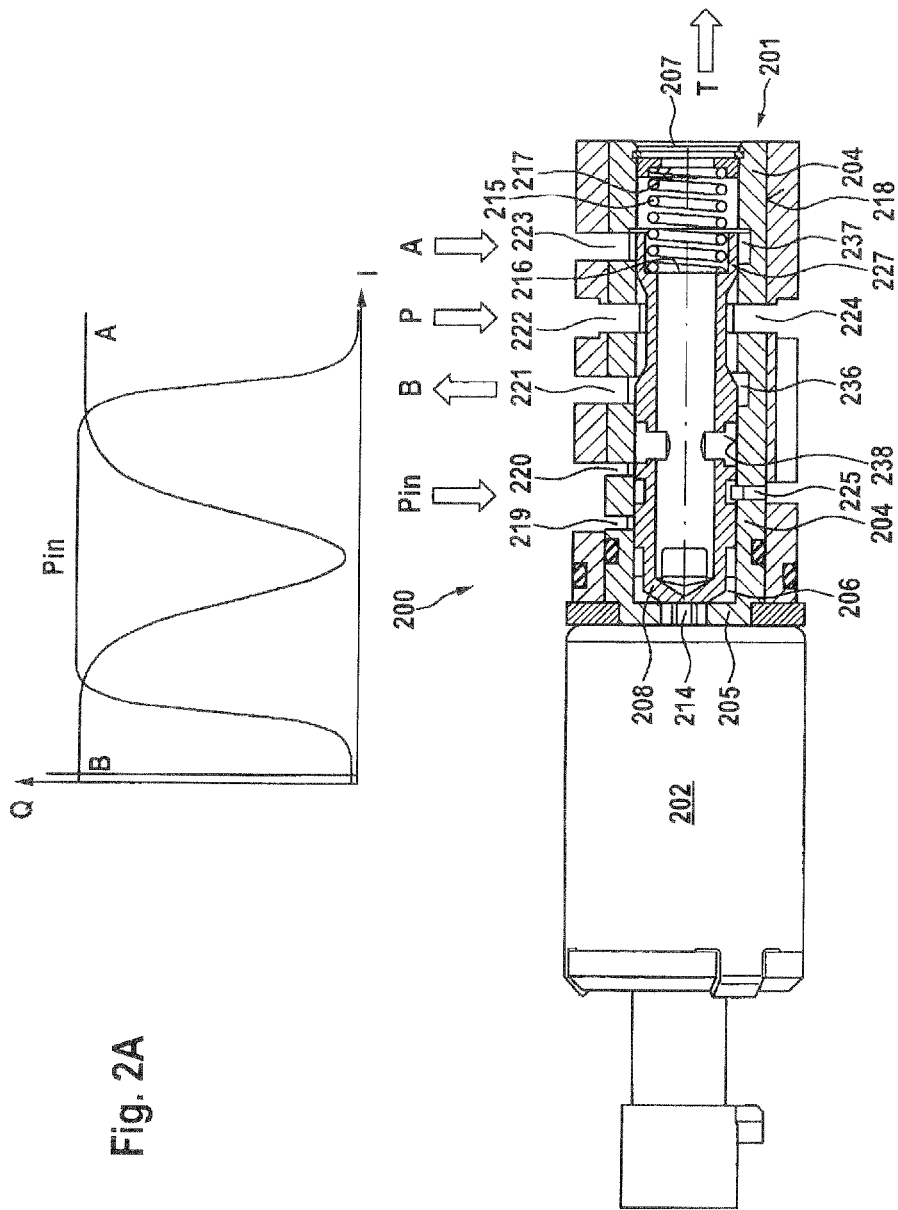
FIGS. 2A-2E show axial sectional views of an exemplary control valve according to the second aspect of the invention.

FIG. 2A shows a position of the control piston 208 in which the magnet armature of the electromagnet 202 is electrically de-energized. As indicated by the corresponding arrows, in said position of the control piston 208, the working port B is connected in terms of flow to the inflow port P via the third piston annular groove 242, whereas the working port A is connected in terms of flow to the outflow port T via the housing cavity 206. Furthermore, the pin port Pin is connected in terms of flow to the outflow port T via the second piston annular groove 241 and the first piston radial openings 243.

Corresponding to the flow conditions explained above, in said position of the control piston 208, the working port B is acted on to a maximum extent with pressure medium, whereas both the working port A and also the pin port Pin are not acted on (zero volume flow). Said position of the control piston 208 can be utilized for a late adjustment of the inner rotor relative to the outer rotor, wherein as it passes the base position, the pin can lock in order to lock the inner and outer rotors for conjoint rotation.

Figure 2B:
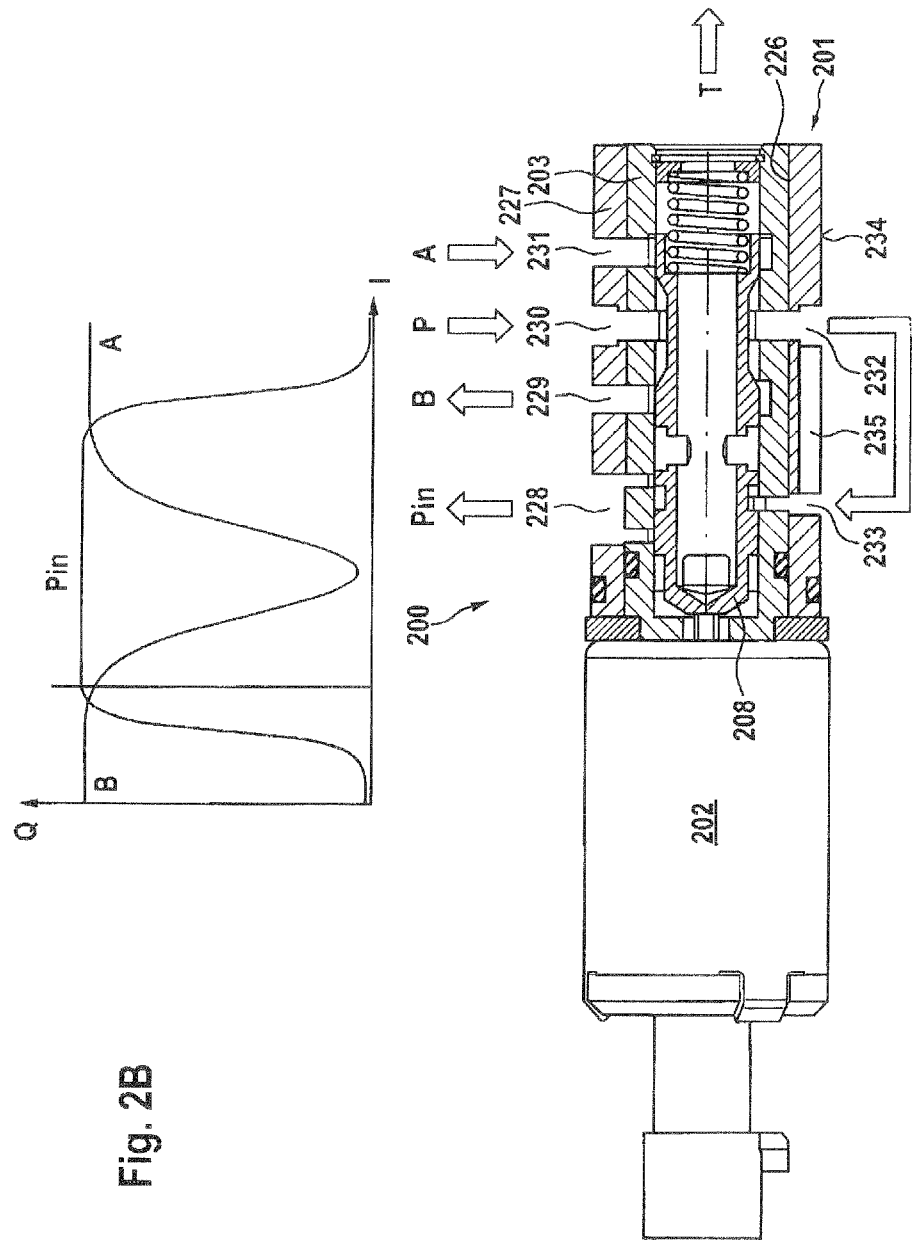

FIG. 2B shows a further position of the control piston 208 in which the magnet armature of the electromagnet 202 is electrically energized with a non-zero current of value I1, such that the control piston 208 is displaced (to the right in FIGS. 2A-2E) counter to the spring force of the helical compression spring 215 by the action of the valve plunger 214. As indicated by the corresponding arrows, in said position, the working port B is connected in terms of flow to the inflow port. P via the third piston annular groove 242, whereas the working port. A is connected in terms of flow to the outflow port T via the housing cavity 206. The pin port Pin is separated from the outflow port T and is connected in terms of flow to the inflow port P via the first piston annular groove 240, the seventh housing radial opening 225, the sixth housing radial opening 233, the axial groove 235, the fifth sleeve radial opening 232, the sixth housing radial opening 224 and the third piston annular groove 242.

Corresponding to the flow conditions, the working port B continues to be acted on to a maximum extent with pressure medium and the pin port Pin is acted on with pressure medium to a small extent.

Figure 2C:
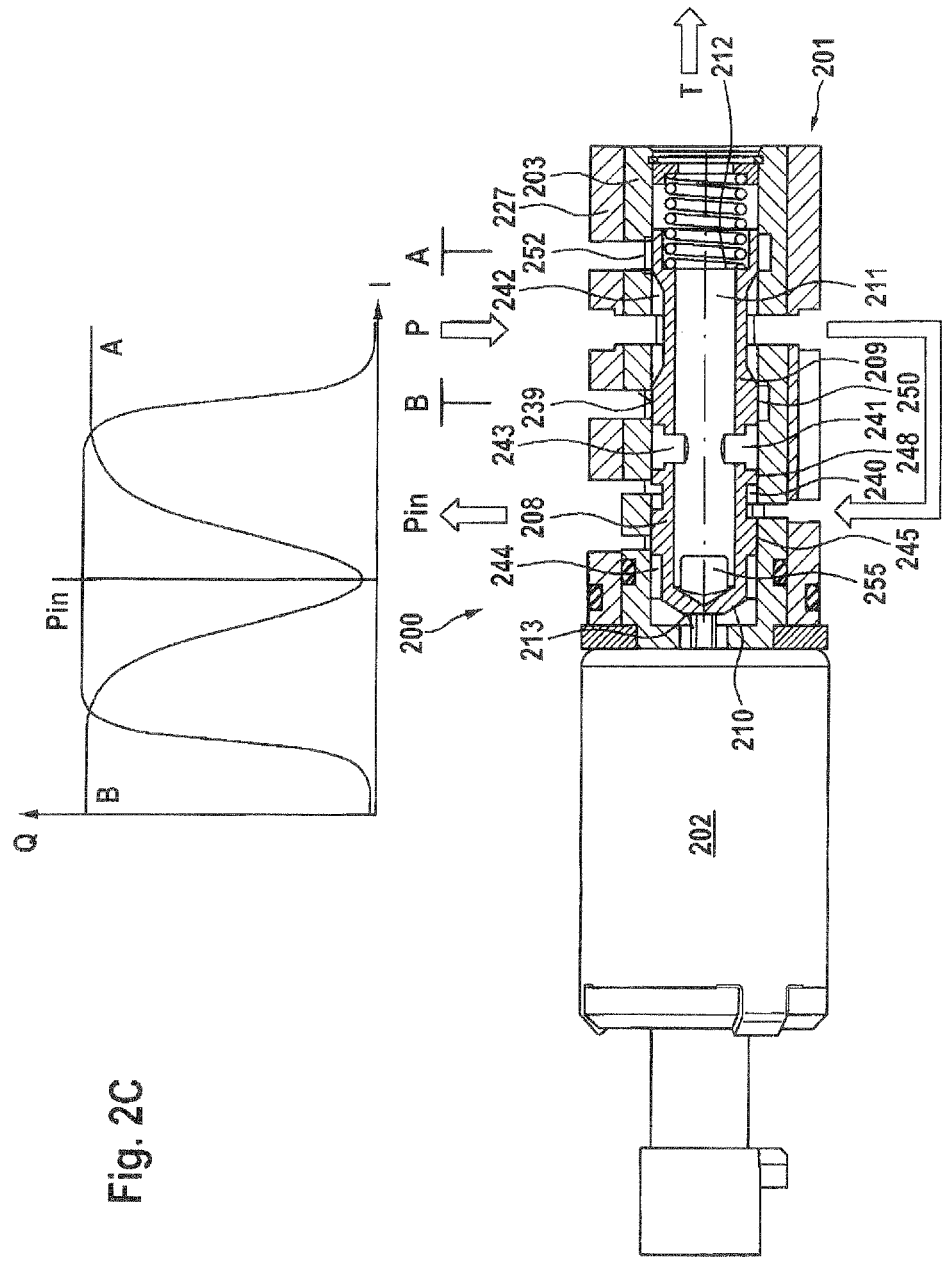

FIG. 2C shows a further position of the control piston 208 in which the magnet armature of the electromagnet 202 is electrically energized with a higher current of value I2 (I2>I1), such that the control piston 208 is displaced yet further counter to the spring force of the helical compression spring 215 by the action of the valve plunger 214. In said position, the working port A and the working port B are separated both from the inflow port P and also from the outflow port T. At the same time, the pin port Pin is connected in terms of flow to the inflow port P.

Corresponding to the flow conditions, the two working ports A and B have in the volume flow characteristic curve a minimal volume flow arising from leakage flows, whereas the pin port Pin is acted on with pressure medium to a maximum extent. Said position of the control piston 208 may be used to fix a phase relationship between the outer and inner rotors.

Figure 2D:
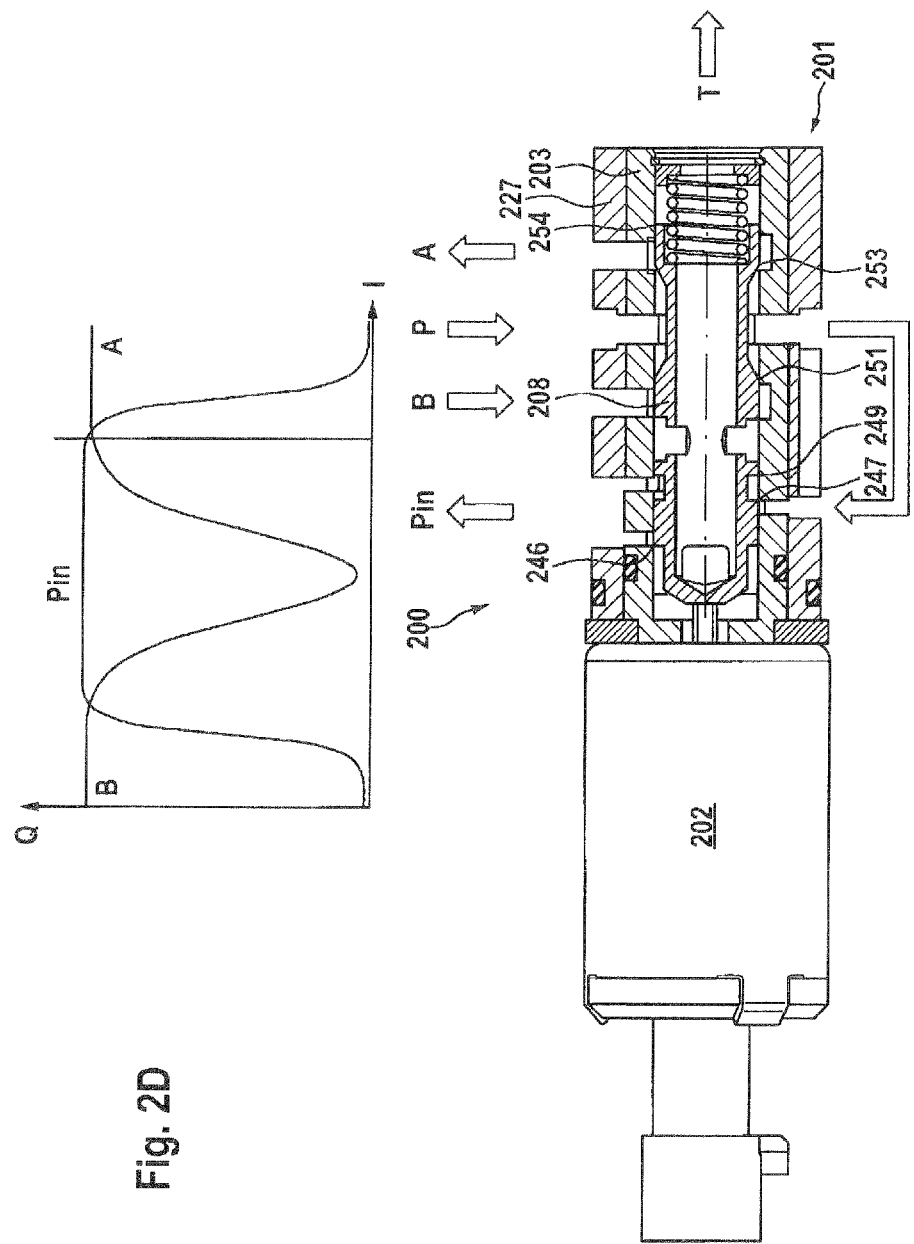

FIG. 2D shows a further position of the control piston 208 in which the magnet armature of the electromagnet 202 is electrically energized with a yet higher current of value I3 (I3>I2), such that the control piston 208 is displaced yet further counter to the spring force of the helical compression spring 215 by the action of the valve plunger 214. As specified, in said position, the working port A is connected in terms of flow to the inflow port P via the third piston annular groove 242, whereas the working port B is connected in terms of flow to the outflow port T via the second piston annular groove 241 and the associated first piston radial openings 243. Furthermore, a volume flow in the flow connection between the pin port Pin and the inflow port P is progressively reduced by the second control edge 247 of the first annular web 245.

Corresponding to the flow conditions, the working port A is acted on to a maximum extent with pressure medium, and the pin port Pin is acted on to a lesser extent with pressure medium.

Figure 2E:
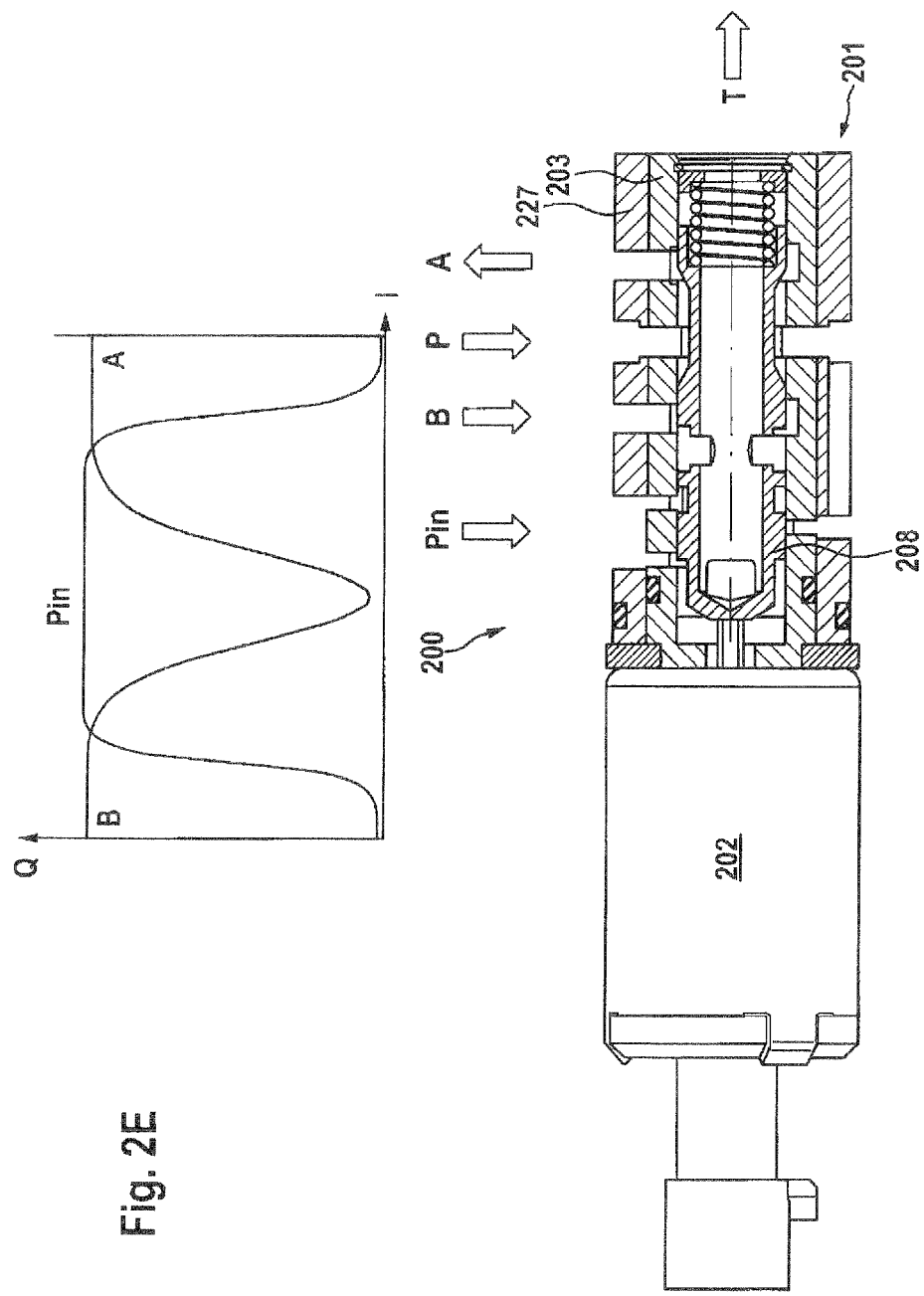

Finally, FIG. 2E shows a further position of the control piston 208 in which the magnet armature of the electromagnet 202 is electrically energized with a yet higher current of value I4 (I4>I3), such that the control piston 208 is displaced yet further, corresponding to a maximum deflection, counter to the spring force of the helical compression spring 215 by the action of the valve plunger 214. As stated, in said position, the working port A is connected in terms of flow to the inflow port P via the third piston annular groove 242, whereas the working port B is connected in terms of flow to the outflow port T via the second piston annular groove 241 and the associated first piston radial openings 243. Furthermore, the pin port Pin is connected in terms of flow to the outflow port T, in a manner controlled by the first control edge 246, via the annular recess 244 and the second piston radial openings 255.

Corresponding to the flow conditions, the working port A is acted on to a maximum extent with pressure medium, whereas the pin port is not acted on (zero volume flow). Said position of the control piston 208 may be used for an early adjustment of the inner rotor relative to the outer rotor, wherein when it reaches the base position, the pin can lock in order to lock the outer and inner rotors for conjoint rotation.

The control valve 200 therefore makes it possible, both in the case of hydraulic late adjustment and also in the case of hydraulic early adjustment of the inner rotor relative to the outer rotor, for the outer and inner rotors to be locked for conjoint rotation in a base position offset in the "early" direction in relation to the late position.

Consideration shall now be given to FIGS. 3A-3E, which show in each case axial sectional views of a third example of a control valve according to the invention.

In this, the control valve 300 is composed of a (hydraulic) valve part 301 and an electromagnet 302 which serves to actuate the valve part 301. The valve part 301 comprises a substantially hollow cylindrical valve housing 303 with a housing jacket 304 which extends in the axial direction and which has a housing end side 305 arranged perpendicular to the axial direction. The housing jacket 304 forms a housing cavity 306 which is open at one side and which has an axial housing cavity opening 307.

Coaxially with respect to the valve housing 303, a substantially hollow cylindrical control piston 308 is held in an axially movable manner in the housing cavity 306. The control piston 308, which is formed in the manner of a hollow piston, comprises a piston jacket 309 extending in the axial direction and, as an end section, a first piston crown 310 and second piston crown 312 arranged perpendicular to the axial direction. The piston jacket 309 and the two piston crowns 310, 312 together border an axially closed piston cavity 311. The piston jacket 309 is matched in terms of its radial dimension to the inner circumference of the housing jacket 304.

That end surface 313 of the first piston crown 310 of the control piston 308 which is at the left in FIGS. 3A-3E is engaged on by a valve plunger 314 which is fastened rigidly to a magnet armature (not illustrated) of the electromagnet 302. When the magnet armature is electrically energized, the valve plunger 314 is displaced in the axial direction toward the hydraulic valve part 301 and, here, adjusts the control piston 308 in the axial direction counter to the spring force of a helical compression spring 315. The helical compression spring 315 is supported for this purpose with one end thereof against a first annular step 316 of the control piston 308 and with the other end thereof against a second annular step 317 of the valve housing 303. If the magnet armature is electrically de-energized, the helical compression spring 315 returns the control piston 308 into its initial position (to the left in FIGS. 3A-3E).

The housing jacket 304 of the valve housing 303 has formed into it seven housing radial openings 318-324 which are axially spaced apart from one another and which open out in each case into the housing cavity 306.

Corresponding to the port allocation specified in FIGS. 3A-3E,
- a first housing radial opening 318 serves as a (first) radial outflow port T1 for connecting to a pressure medium tank,
- a second housing radial opening 319 serves as an inflow port P for connecting to a pressure medium pump,
- a third housing radial opening 320 serves as a (second) radial outflow port T2 for connecting to the pressure medium tank,
- a fourth housing radial opening 321 serves as a working port B for connecting to the pressure chambers B which effect an adjustment of the inner rotor relative to the outer rotor in the "late" direction,
- a fifth housing radial opening 322 serves as a working port A for connecting to the pressure chambers A which effect an adjustment of the inner rotor relative to the outer rotor in the "early" direction,
- a sixth housing radial opening 323 serves as a (third) radial outflow port T3 for connecting to the pressure medium tank,
- a seventh housing radial opening 324 serves as a pin port Pin for connecting to the at least one pin of the locking device.

Furthermore, the axial housing cavity opening 307 serves as a (fourth) axial outflow port T4 for connecting to a pressure medium tank.

A piston outer circumferential surface 325 of the piston jacket 309 has formed into it four encircling piston annular grooves which are axially spaced apart, specifically a first piston annular groove 326, a second piston annular groove 327 a third piston annular groove 328 and a fourth piston annular groove 329. Formed into the first piston annular groove 326 and the third piston annular groove 328 so as to be uniformly distributed about the circumference in each case are first and second piston radial openings 330, 331 respectively which open out into the piston cavity 311. Furthermore, a first annular recess 332 is formed into the piston outer circumferential surface 325 adjacent to the first piston crown 310, and a second annular recess 333 is formed into the piston outer circumferential surface 325 adjacent to the second piston crown 312.

A first annular web 334 is formed by the first annular recess 332 and the first piston annular groove 326. A second annular web 335 is formed by the first piston annular groove 326 and the second piston annular groove 327. A third annular web 336 is formed by the second piston annular groove 327 and the third piston annular groove 328, which third annular web is provided with a first control edge 340 and a second control edge 341. A fourth annular web 337 is formed by the third piston annular groove 328 and the fourth piston annular groove 329, which fourth annular web is provided with a third control edge 342 and a fourth control edge 343. A fifth annular web 338 is formed by the fourth piston annular groove 329 and the second annular recess 333, which fifth annular web is provided with a fifth control edge 344 and a sixth control edge 341. Furthermore, the fifth annular web 338 has third piston radial openings 339 which open out in each case into the piston cavity 311.

The first to fifth annular webs 334-338 serve in particular for axially guiding the control piston 308 within the valve housing 303.

The first annular web 334 and the second annular web 335 do not control pressure medium ducts but rather serve merely to axially delimit the first piston annular groove 326. The first piston annular groove 326 connects the inflow port P to the piston cavity 311 in all positions of the control piston 308. The first annular recess 332 connects the outflow port T1 to the housing cavity 306 in all positions of the control piston 308.

The circumferential surface of the third annular web 336 is formed such that it can sealingly cover or open up the working port B in order thereby, by means of a change in the opening cross sections of the fourth housing radial openings 321, to regulate the amount of pressure medium flowing through, wherein an adjustment of the opening cross sections is realized by means of the first control edge 340 and the second control edge 341 of the third annular web 336. Here, a pressure medium duct, formed by the second piston annular groove 327, to the outflow port T2 can be controlled by means of the first control edge 340 and a pressure medium duct, formed by the third piston annular groove 328 and the second piston radial openings 331, to the inflow port P can be controlled by means of the second control edge 341.

The circumferential surface of the third annular web 337 is formed such that, during an axial displacement of the control piston 308, said circumferential surface can sealingly cover or open up the working port A in order thereby, by means of a change in the opening cross sections of the fifth housing radial openings 322, to regulate the amount of pressure medium flowing though, wherein an adjustment of the opening cross sections of the fifth housing radial openings 333 is realized by means of the third control edge 342 and the fourth control edge 343 of the fourth annular web 337. Here, a pressure medium duct, formed by the third piston annular groove 328 and the second piston radial openings 331, to the inflow port P can be controlled by means of the third control edge 342, and a pressure medium duct, formed by the fourth piston annular groove 329, to the outflow port T3 can be controlled by means of the fourth control edge 343.

The circumferential surface of the fifth annular web 338 is formed such that, during an axial displacement of the control piston 308, said circumferential surface can sealingly cover or open up the pin port Pin in order thereby, by means of a change in the opening cross sections of the seventh housing radial openings 324, to regulate the amount of pressure medium flowing though, wherein an adjustment of the opening cross sections is realized by means of the fifth control edge 344 and the sixth control edge 345 of the fifth annular web 338. Here, a pressure medium duct, formed by the fourth piston annular groove 329, to the third outflow port T3 can be controlled by means of the fifth control edge 344, and a pressure medium duct, formed by the second annular recess 333 and the housing cavity 306, to the outflow port T4 can be controlled by means of the sixth control edge 345. Furthermore, the third piston radial opening 339 can be connected to the seventh housing radial opening 324.

Therefore, with the port allocation shown in FIGS. 3A-3E, it is possible by means of the axial displacement of the control piston 308 for a flow connection between the working port B and the inflow port P or the outflow port T2,
the working port A and the inflow port P or the outflow port T3,
the pin port Pin and the inflow port P or the outflow port T4,
to be selectively controlled.

Different positions of the control piston 308 will now be explained on the basis of FIGS. 3A-3E, wherein in FIGS. 3A-3E (similarly to FIGS. 1A-1E), a qualitative profile of the volume flow characteristic curve of the control valve 300 is illustrated in each case by means of a diagram.

FIG. 3A shows a position of the control piston 308 in which the magnet armature of the electromagnet 302 is electrically de-energized. As indicated by the corresponding arrows, in said position of the control piston 308, the working port B is connected in terms of flow to the inflow port P via the third piston annular groove 328 and the second piston radial openings 321, whereas the working port A is connected in terms of flow to the outflow port T3 via the fourth piston annular groove 329. Furthermore, the pin port Pin is connected in terms of flow to the outflow port T4 via the second annular recess 333.

Corresponding to the flow conditions, in said position of the control piston 308, the working port B is acted on to a maximum extent with pressure medium, whereas both the working port A and also the pin port Pin are not acted on (zero volume flow). Said position of the control piston 308 can be utilized for a late adjustment of the inner rotor relative to the outer rotor, wherein as it passes the base position, the pin can lock in order to lock the inner and outer rotors for conjoint rotation.

Figure 3B:
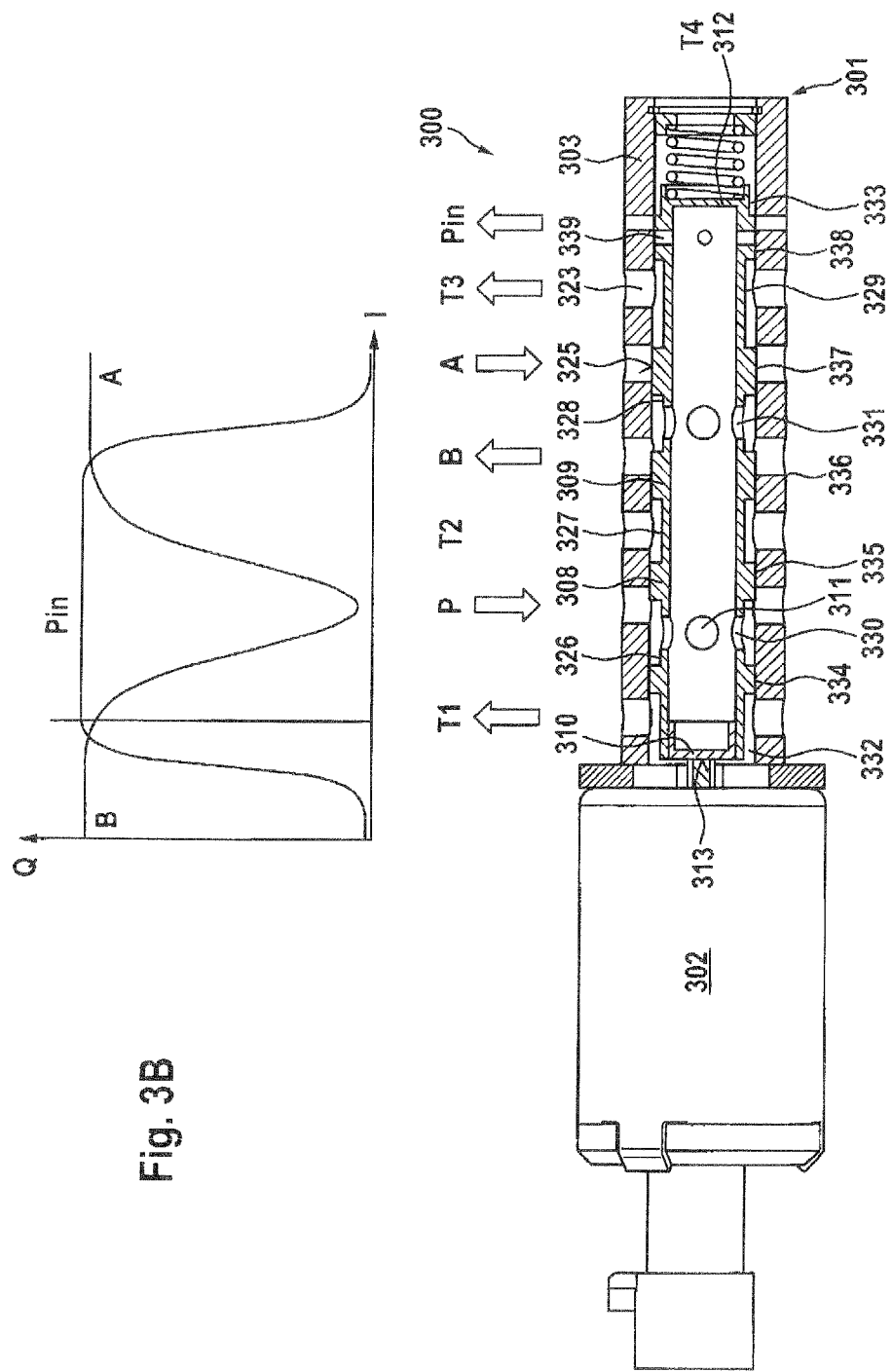

FIG. 3B shows a further position of the control piston 308 in which the magnet armature of the electromagnet 302 is electrically energized with a non-zero current of value I1, such that the control piston 308 is displaced (to the right in FIGS. 3A-3E) counter to the spring force of the helical compression spring 315 by the action of the valve plunger 314. As indicated by the corresponding arrows, in said position, the working port B is connected in terms of flow to the inflow port P via the third piston annular groove 328 and the second piston radial openings 321, whereas the working port A is connected in terms of flow to the outflow port T3 via the fourth piston annular groove 329. The pin port Pin is now separated from the outflow port T4 and, instead, is connected in terms of flow to the inflow port P via the third piston radial openings 339.

Corresponding to the flow conditions, the working port B continues to be acted on to a maximum extent with pressure medium, while the volume flow of the pin port Pin rises sharply.

Figure 3C:
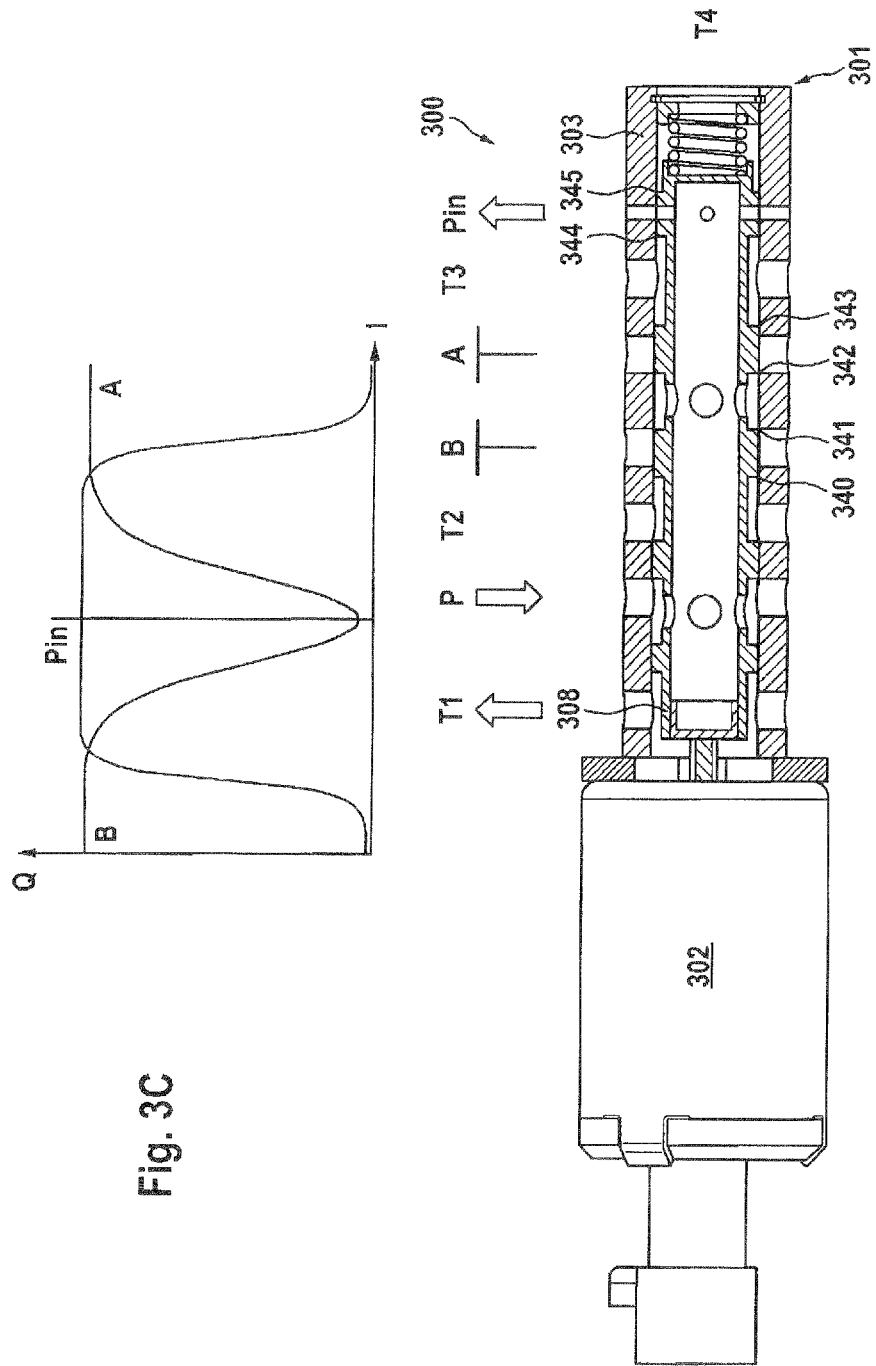

FIG. 3C shows a further position of the control piston 308 in which the magnet armature of the electromagnet 302 is electrically energized with a higher current of value I2 (I2>I1), such that the control piston 308 is displaced yet further counter to the spring force of the helical compression spring 315 by the action of the valve plunger 314. In said position, the working port A and the working port B are separated both from the inflow port P and also from the outflow ports T2 and T3. At the same time, the pin port Pin is connected in terms of flow to the inflow port P via the third piston radial openings 339.

Corresponding to said flow conditions, the two working ports A and B have in the volume flow characteristic curve a minimal volume flow arising from leakage flows, whereas the pin port Pin is acted on with pressure medium to a maximum extent. Said position of the control piston 308 may be used to fix a phase relationship between the outer and inner rotors.

FIG. 3D shows a further position of the control piston 308 in which the magnet armature of the electromagnet 302 is electrically energized with a yet higher current of value I3 (I3>I2), such that the control piston 308 is displaced yet further counter to the spring force of the helical compression spring 315 by the action of the valve plunger 314. As specified, in said position, the working port A is connected in terms of flow to the inflow port P via the third piston annular groove 328 and the second piston radial openings 321, whereas the working port B is connected in terms of flow to the outflow port T2 via the second piston annular groove 327. Furthermore, a volume flow in the flow connection between the pin port Pin and the inflow port P is progressively reduced by means of an axial displacement of the third piston radial openings 339 relative to the seventh housing radial openings 324.

Corresponding to the flow conditions, the working port A is acted on to a maximum extent with pressure medium, and the pin port Pin is acted on to a lesser extent.

Figure 3E:
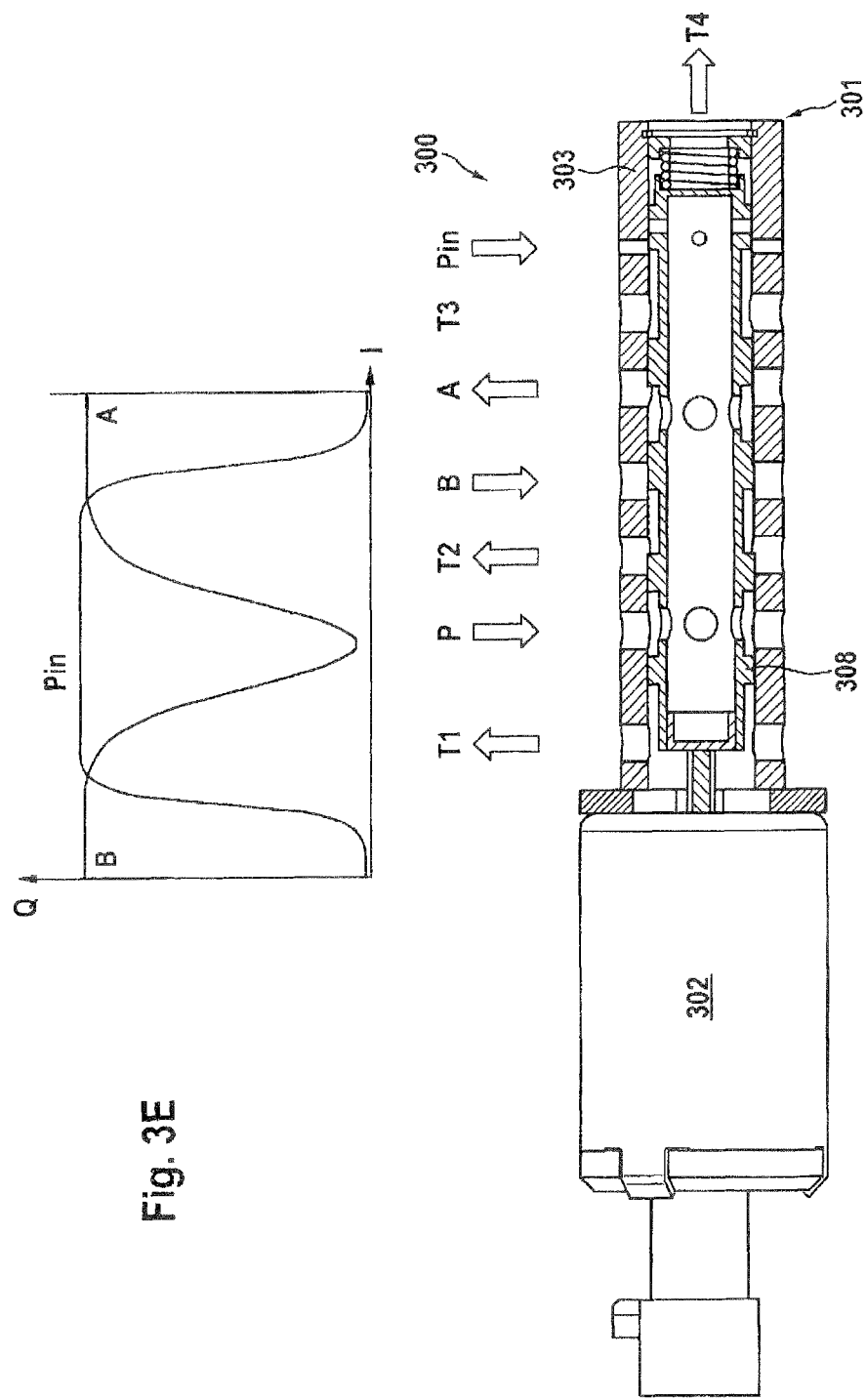

Finally, FIG. 3E shows a further position of the control piston 308 in which the magnet armature of the electromagnet 302 is electrically energized with a yet higher current of value I4 (I4>I3), such that the control piston 308 is displaced yet further, corresponding to a maximum deflection, counter to the spring force of the helical compression spring 315 by the action of the valve plunger 314. As stated, in said position, the working port A is connected in terms of flow to the inflow port P via the third piston annular groove 328 and the second piston radial openings 321, whereas the working port B is connected in terms of flow to the outflow port T2 via second piston annular groove 327. Furthermore, the pin port Pin is connected in terms of flow to the outflow port T3 via the fourth piston annular groove 329.

Corresponding to the flow conditions, the working port A is acted on to a maximum extent with pressure medium, whereas the pin port Pin is not acted on. Said position of the control piston 308 may be used for an early adjustment of the inner rotor relative to the outer rotor, wherein when it reaches the base position, the pin can lock in order to lock the outer and inner rotors for conjoint rotation.

The control valve 300 therefore makes it possible, both in the case of hydraulic late adjustment and also in the case of hydraulic early adjustment of the inner rotor relative to the outer rotor, for the outer and inner rotors to be locked for conjoint rotation in a base position offset in the "early" direction in relation to the late position.

Figure 4:
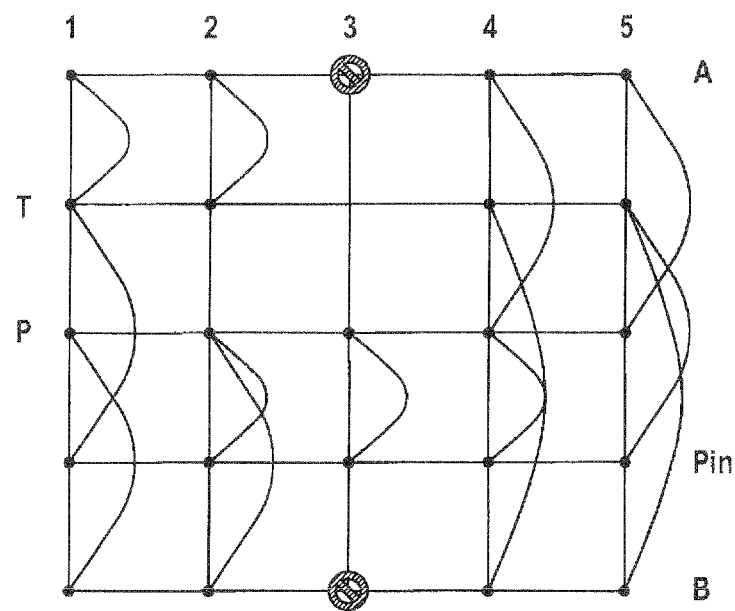
FIG. 4 shows a schematic illustration depicting the shift logic of the control valves according to the invention.

FIG. 4 illustrates, in a matrix-like diagram, a switching logic diagram common to the control valves shown in FIGS. 1A-1E, 2A-2E and 3A-3E. In the diagram, the outflow port T and inflow port P are illustrated on the left-hand vertical axis, and the working port A, the working port B and pin port Pin are illustrated on the right-hand vertical axis. The horizontal axis symbolizes the different switching positions of the control valves. The lines denote in each case a flow connection between the ports connected by the line. The struck-through circle symbolizes a blocked flow connection.

Accordingly, each of the control valves is characterized by five different switching positions of the control piston. In a first position of the control piston (denoted by "1" in FIG. 4), the working port A is connected in terms of flow to the outflow port T, the working port B is connected in terms of flow to the inflow port P, and the pin port Pin is connected in terms of flow to the outflow port T. In a second position of the control piston (denoted by "2" in FIG. 4), the working port A is connected in terms of flow to the outflow port T, the working port B is connected in terms of flow to the inflow port P, and the pin port Pin is connected in terms of flow to the inflow port P. In a third position of the control piston (denoted by "3" in FIG. 4), the working port A is connected in terms of flow neither to the inflow port P nor to the outflow port T (blocked), the working port B is connected in terms of flow neither to the inflow port P nor to the outflow port T (blocked), and the pin port Pin is connected in terms of flow to the inflow port P. In a fourth position of the control piston (denoted by "4" in FIG. 4), the working port A is connected in terms of flow to the inflow port P, the working port B is connected in terms of flow to the outflow port T and the pin port Pin is connected in terms of flow to the inflow port P. In a fifth position of the control piston (denoted by "5" in FIG. 4), the working port A is connected in terms of flow to the inflow port P, the working port B is connected in terms of flow to the outflow port T and the pin port Pin is connected in terms of flow to the outflow port T.

The five different positions of the control piston suffice to provide pressure medium control in a hydraulic camshaft adjuster, wherein in position "1": the drive output part can be hydraulically adjusted relative to the drive input part in the "late" direction and the pin connected to the outflow port T can lock in order to lock the drive input part and drive output part for conjoint rotation in the base position;

position "2": the drive output part can be hydraulically adjusted relative to the drive input part in the "late" direction and the pin connected to the inflow port P is forced back into its receptacle, such that a change in the phase relationship between the drive input part and drive output part is permitted and locking of the drive input part and drive output part for conjoint rotation in the base position is prevented;

position "3": the drive output part can be hydraulically clamped relative to the drive input part and the pin connected to the inflow port P is forced back into its receptacle, such that locking of the drive input part and drive output part for conjoint rotation is prevented;

position "4": the drive output part can be hydraulically adjusted relative to the drive input part in the "early" direction and the pin connected to the inflow port P is forced back into its receptacle, such that a change in the phase relationship between the drive input part and drive output part is permitted and locking of the drive input part and drive output part for conjoint rotation in the base position is prevented;

position "5": the drive output part can be hydraulically adjusted relative to the drive input part in the "early" direction and the pin connected to the outflow port T can lock in order to lock the drive input part and drive output part for conjoint rotation in the base position.

Therefore, in the control valves shown in the exemplary embodiments, the pin for locking the drive input part and drive output part for conjoint rotation can lock in the base position in the case of a hydraulic adjustment of the drive output part relative to the drive input part both in the "late" direction and also in the "early" direction, such that additional measures for moving the drive output part into the base position may advantageously be dispensed with.

Even though the exemplary embodiments show a displacement mechanism in which the control piston is displaced by a valve plunger actuated by means of an electromagnet, it is likewise possible for some other actuator to be provided for actuating the valve plunger, such as for example an electric actuating motor.

Even though the hydraulic valve parts or control valves have been described in terms of their use for pressure medium control for a hydraulic camshaft adjuster of an internal combustion engine, they may likewise be used in any other hydraulic phase adjuster of an internal combustion engine.

LIST OF REFERENCE NUMERALS

100 Control Valve
101 Hydraulic Valve Part
102 Electromagnet
103 Valve Housing
104 Housing Jacket
105 Housing Base
106 Housing Cavity
107 Housing Cavity Opening
108 Control Piston
109 Piston Jacket
110 Piston Lug
111 Piston Cavity
112 Piston Cavity Opening
113 End Surface
114 Valve Plunger
115 Helical Compression Spring
116 First Annular Step
117 Second Annular Step
118 Housing Outer Circumferential Surface
119 First Housing Annular Groove
120 Second Housing Annular Groove
121 Third Housing Annular Groove
122 Fourth Housing Annular Groove
123 Fifth Housing Annular Groove
124 Sixth Housing Annular Groove
125 First Housing Radial Opening
126 Second Housing Radial Opening
127 Third Housing Radial Opening
128 Fourth Housing Radial Opening
129 Fifth Housing Radial Opening
130 Sixth Housing Radial Opening
131 Piston Outer Circumferential Surface
132 Piston Recess
133 First Piston Annular Groove
134 Second Piston Annular Groove
135 Third Piston Annular Groove
136 Fourth Piston Annular Groove
137 First Piston Radial Opening
138 Second Piston Radial Opening
139 Third Piston Radial Opening
140 First Annular Web
141 Second annular Web
142 Third Annular Web
143 Fourth Annular Web
144 Fifth Annular Web
145 First Control Edge
146 Second Control Edge
147 Third Control Edge
148 Fourth Control Edge
149 Fifth Control Edge
150 Sixth Control Edge
151 Seventh Control Edge
152 Eighth Control Edge
200 Control Valve
201 Valve Part
202 Electromagnet
203 Valve Housing
204 Housing Jacket
205 Housing Pedestal 206 Housing Cavity
207 Housing Cavity Opening
208 Control Piston
209 Piston Jacket
210 Piston Crown
211 Piston Cavity
212 Piston Cavity Opening
213 End Surface
214 Valve Plunger
215 Helical Compression Spring
216 First Annular Step
217 Second Annular Step
218 Housing Outer Circumferential Surface
219 First Housing Radial Opening
220 Second Housing Radial Opening
221 Third Housing Radial Opening
222 Fourth Housing Radial Opening
223 Fifth Housing Radial Opening
224 Sixth Housing Radial Opening
225 Seventh Housing Radial Opening
226 Sleeve Cavity
227 Valve Sleeve
228 First Sleeve Radial Opening
229 Second Sleeve Radial Opening
230 Third Sleeve Radial Opening
231 Fourth Sleeve Radial Opening
232 Fifth Sleeve Radial Opening
233 Sixth Sleeve Radial Opening
234 Sleeve Outer Circumferential Surface
235 Axial Groove
236 First Housing Annular Groove
237 Second Housing Annular Groove
238 Housing Inner Circumferential Surface
239 Piston Outer Circumferential Surface
240 First Piston Annular Groove
241 Second Piston Annular Groove
242 Third Piston Annular Groove
243 First Piston Radial Opening
244 Annular Recess
245 First Annular Web
246 First Control Edge
247 Second Control Edge
248 Second Annular Web
249 Third Control Edge
250 Third Annular Web
251 Fourth Control Edge
252 Fourth Annular Web
253 Fifth Control Edge
254 Sixth Control Edge
255 Second Piston Radial Opening
300 Control Valve
301 Valve Part
302 Electromagnet
303 Valve Housing
304 Housing Jacket
305 Housing End Side
306 Housing Cavity
307 Housing Cavity Opening
308 Control Piston
309 Piston Jacket
310 First Piston Crown
311 Piston Cavity
312 Second Piston Crown
313 End Surface
314 Valve Plunger
315 Helical Compression Spring
316 First Annular Step
317 Second Annular Step
318 First. Housing Radial Opening
319 Second Housing Radial Opening
320 Third Housing Radial Opening
321 Fourth Housing Radial Opening
322 Fifth Housing Radial Opening
323 Sixth Housing Radial Opening
324 Seventh Housing Radial Opening
325 Piston Outer Circumferential Surface
326 First Piston Annular Groove
327 Second Piston Annular Groove
328 Third Piston Annular Groove
329 Fourth Piston Annular Groove
330 First Piston Radial Opening
331 Second Piston Radial Opening
332 First Annular Recess
333 Second Annular Recess
334 First Annular Web
335 Second Annular Web
336 Third Annular Web
337 Fourth Annular Web
338 Fifth Annular Web
339 Third Piston Radial Opening
340 First Control Edge
341 Second Control Edge
342 Third Control Edge
343 Fourth Control Edge
344 Fifth Control Edge
345 Sixth Control Edge

The invention claimed is:

1. A control valve for controlling pressure medium flows, which comprises:
a cylindrical valve housing having a housing cavity, the housing cavity is open at one side and has an axial outflow port, a radial first working port, a radial second working port, a radial third working port, a first radial pressure port and a second radial pressure port, each port open into the housing cavity, the first pressure port being arranged in an axial direction between the first working port and the second working port and the second pressure port being arranged in the axial direction between the second working port and the third working port; and
a cylindrical control piston, which is axially movable within the housing cavity, having a piston cavity open at one side toward the outflow port, the control piston being designed such that, as a result of axial displacement thereof the first working port and the second working port can be fluidly connected, selectively, to the first pressure port and the outflow port, the third working port can be fluidly connected, selectively, to the second pressure port and the outflow port, so that in a first piston position, the first working port is fluidly connected to the first pressure port and simultaneously the third working port is connected in fluid communication to the outflow port, and in a second piston position, the second working port is fluidly connected to the first pressure port and simultaneously the third working port is fluidly connected to the outflow port.

2. The control valve as claimed in claim 1, wherein the third working port has a first port section and, axially spaced apart from the first port section, a second port section, and wherein the control piston has a first control section which, in the first piston position, fluidly connects the first working port to the first pressure port and, in the second piston position, fluidly connects the second working port to the first pressure port and a second control section which, in the first piston position, fluidly connects the first port section to the outflow port and, in the second piston position, fluidly connects the second port section to the outflow port.

3. The control valve as claimed in claim 1, wherein the control piston is designed such that, in a third piston position, the second working port is fluidly connected to the first pressure port and simultaneously both the first working port and the third working port are fluidly connected to the outflow port.

4. The control valve as claimed in claim 1, wherein the control piston is designed such that, in a fourth piston position, both the first working port and the second working port are blocked and simultaneously the third working port is fluidly connected to the second pressure port.

5. The control valve as claimed in claim 1, wherein the control piston is designed such that, in a fifth piston position, the first working port is fluidly connected to the first pressure port and simultaneously both the second working port and the third working port are fluidly connected to the outflow port.

6. The control valve as claimed in claim 1, further comprising a valve sleeve having a pressure medium line which fluidly connects the first pressure port to the second pressure port, wherein the valve housing is held in the valve sleeve.

7. A control valve for controlling pressure medium flows, comprising:
    a cylindrical valve housing having a housing cavity, the housing cavity is open at one side and has an axial outflow port, a valve sleeve, which surrounds the valve housing and has a radial first working port, a radial second working port, a radial third working port and a radial pressure port, each port penetrate through the valve housing and open into the housing cavity, the pressure port is arranged axially between the first working port and the second working port, and the valve sleeve has a pressure medium line for fluidly connecting the pressure port to the third working port; and
    a cylindrical control piston, which is axially movable within the housing cavity, having a piston cavity open at one side toward the outflow port, the control piston being designed such that, as a result of axial displacement thereof, the first working port and the second working port can be fluidly connected, selectively, to the pressure port and the outflow port, the third working port can be fluidly connected, selectively, to the pressure port and the outflow port, so that in a first piston position, the first working port is fluidly connected to the pressure port and simultaneously the third working port is fluidly connected to the outflow port and, in a second piston position, the second working port is fluidly connected to the pressure port and simultaneously the third working port is fluidly connected to the outflow port.

8. The control valve as claimed in claim 7, wherein the control piston is designed such that, in a third piston position, the second working port is fluidly connected to the pressure port and simultaneously both the first working port and also the third working port are fluidly connected to the outflow port.

9. The control valve as claimed in claim 7, wherein the control piston is designed such that, in a fourth piston position, both the first working port and the second working port are blocked and simultaneously the third working port is fluidly connected to the pressure port.

10. The control valve as claimed in claim 7, wherein the control piston is designed such that, in a fifth piston position, the first working port is fluidly connected to the pressure port and simultaneously both the second working port and the third working port are fluidly connected to the outflow port.

11. A control valve for controlling pressure medium flows, which comprises:
    a cylindrical valve housing having a housing cavity, the housing cavity is open at one side and has an axial outflow port, a radial first working port, a radial second working port, a radial third working port, a radial pressure port, a radial first outflow port, a radial second outflow port and a radial third outflow port, each port open into the housing cavity, the pressure port is arranged axially between the first outflow port and the second outflow port, the first working port and the second working port are arranged between the second outflow port and the third outflow port; and
    a cylindrical control piston, which is axially movable within the housing cavity and has a piston cavity, the control piston being designed such that, as a result of the axial displacement thereof, the first working port can be fluidly connected, selectively, to the pressure port and the second outflow port, the second working port can be fluidly connected, selectively, to the pressure port and the third outflow port, the third working port can be fluidly connected, selectively, to the pressure port and the axial outflow port, so that, in a first piston position, the first working port is fluidly connected to the pressure port and simultaneously the third working port is fluidly connected to the axial outflow port, and, in a second piston position, the second working port is fluidly connected to the pressure port and at the same time the third working port is fluidly connected to the axial outflow port.

12. The control valve as claimed in claim 11, wherein the control piston is designed such that, in a third piston position, the second working port is fluidly connected to the pressure port and simultaneously the first working port is fluidly connected to the second outflow port and the third working port is fluidly connected to the axial outflow port.

13. The control valve as claimed in claim 11, wherein the control piston is designed such that, in a fourth piston position, both the first working port and the second working port are blocked and simultaneously the third working port is fluidly connected to the pressure port.

14. The control valve as claimed in claim 11, wherein the control piston is designed such that, in a fifth piston position, the first working port is fluidly connected to the pressure port and simultaneously the second working port is fluidly connected to the third outflow port and the third working port is fluidly connected to the axial outflow port.

* * * * *